United States Patent
Appelbaum

(10) Patent No.: US 9,908,094 B2
(45) Date of Patent: Mar. 6, 2018

(54) SYSTEM AND METHOD FOR CONVERTING GASEOUS HYDROCARBON MIXTURES INTO HIGHLY-BRANCHED HYDROCARBONS USING ELECTRON BEAM COMBINED WITH ELECTRON BEAM-SUSTAINED NON-THERMAL PLASMA DISCHARGE

(71) Applicant: Jacob G. Appelbaum, Gainsville, FL (US)

(72) Inventor: Jacob G. Appelbaum, Gainsville, FL (US)

(*) Notice: Subject to any disclaimer, the term of this patent is extended or adjusted under 35 U.S.C. 154(b) by 113 days.

(21) Appl. No.: 15/062,769

(22) Filed: Mar. 7, 2016

(65) Prior Publication Data

US 2016/0184791 A1 Jun. 30, 2016

Related U.S. Application Data

(62) Division of application No. 14/076,122, filed on Nov. 8, 2013, now Pat. No. 9,295,966, which is a division
(Continued)

(51) Int. Cl.
*C02F 1/32* (2006.01)
*B01J 19/08* (2006.01)
(Continued)

(52) U.S. Cl.
CPC ........... *B01J 19/085* (2013.01); *B01J 19/008* (2013.01); *C02F 1/305* (2013.01); *C02F 1/34* (2013.01);
(Continued)

(58) Field of Classification Search
CPC . B01J 8/02; B01J 12/002; B01J 19/088; B01J 2219/0894; B01J 2219/0883;
(Continued)

(56) References Cited

U.S. PATENT DOCUMENTS

| | | |
|---|---|---|
| 5,950,732 A | 9/1999 | Agee et al. |
| 6,011,073 A | 1/2000 | Agee et al. |
| (Continued) | | |

FOREIGN PATENT DOCUMENTS

| | | |
|---|---|---|
| CA | 2247414 | 9/1997 |
| CA | 2257848 | 12/1997 |
| WO | 2009028084 | 3/2009 |

OTHER PUBLICATIONS

Kogelschatz, U.; Dielectric-Barrier Discharges: Their History, Discharge Physics, and Industrial Applications; Plasma Chemistry and Plasma Processing, vol. 23, No. 1, Mar. 2003; pp. 1-45.
(Continued)

*Primary Examiner* — Walter D. Griffin
*Assistant Examiner* — Cameron J Allen
(74) *Attorney, Agent, or Firm* — Michael J. Nickerson; Basch & Nickerson LLP

(57) ABSTRACT

A system and method converts first carbon chain condensable fractions of wet natural gas, the first carbon chain fractions having first carbon chains, into liquefiable highly-branched hydrocarbons by cavitating first carbon chain condensable fractions of wet natural gas with natural gas; irradiating the natural gas cavitated condensable fractions of wet natural gas with an electron beam to create second carbon chain fractions; mixing the second carbon chain fractions with natural gas enriched with alkynes and alkenes to a create enriched natural gas and second carbon chain fractions mixture; irradiating the enriched natural gas and second carbon chain fractions mixture with an electron beam to create an irradiated gas mixture; cooling the irradiated gas mixture; and removing liquefied highly-branched hydrocarbons.

24 Claims, 17 Drawing Sheets

Related U.S. Application Data of application No. 13/552,831, filed on Jul. 19, 2012, now abandoned.

(60) Provisional application No. 61/509,152, filed on Jul. 19, 2011, provisional application No. 61/510,772, filed on Jul. 22, 2011, provisional application No. 61/673,064, filed on Jul. 18, 2012.

(51) Int. Cl.

| | | |
|---|---|---|
| *C02F 1/30* | (2006.01) | |
| *C02F 1/34* | (2006.01) | |
| *C02F 11/08* | (2006.01) | |
| *B01J 19/00* | (2006.01) | |
| *C10G 50/00* | (2006.01) | |
| C02F 1/00 | (2006.01) | |
| C02F 1/74 | (2006.01) | |
| C02F 101/32 | (2006.01) | |

(52) U.S. Cl.
CPC .............. *C02F 11/08* (2013.01); *C10G 50/00* (2013.01); *B01J 2219/0869* (2013.01); *B01J 2219/0871* (2013.01); *B01J 2219/0875* (2013.01); *C02F 1/001* (2013.01); *C02F 1/74* (2013.01); *C02F 2101/32* (2013.01); *C02F 2305/023* (2013.01)

(58) Field of Classification Search
CPC ...... C07C 2/76; C07C 2529/06; F25J 1/0022; F25J 1/0052; F25J 1/0231; F25J 1/0239; F25J 1/0241; F25J 1/0292; F25J 3/0209; F25J 3/0233; F25J 3/0238; F25J 3/0242; F25J 1/0214; F25J 2200/04; F25J 2200/08; F25J 2200/74; F25J 2200/78; F25J 2205/50; F25J 2215/62; F25J 2235/60; F25J 2245/02; F25J 2270/12

See application file for complete search history.

(56) References Cited

U.S. PATENT DOCUMENTS

| | | | |
|---|---|---|---|
| 6,155,039 A | 12/2000 | Agee et al. | |
| 6,169,120 B1 | 1/2001 | Beer | |
| 6,201,030 B1 | 3/2001 | Beer | |
| 6,225,358 B1 | 5/2001 | Kennedy | |
| 6,262,131 B1 | 7/2001 | Arcuri et al. | |
| 6,265,453 B1 | 7/2001 | Kennedy | |
| 6,277,894 B1 | 8/2001 | Agee et al. | |
| 6,284,105 B1 | 9/2001 | Eliasson et al. | |
| 6,344,491 B1 | 2/2002 | Beer et al. | |
| 6,512,018 B2 | 1/2003 | Kennedy | |
| 6,794,417 B2 | 9/2004 | O'Beck et al. | |
| 6,797,243 B2 | 9/2004 | Acuri et al. | |
| 6,939,999 B2 | 9/2005 | Abazajian | |
| 6,989,135 B2 | 1/2006 | Kennedy | |
| 6,989,403 B2 | 1/2006 | Huang et al. | |
| 7,271,201 B1 | 9/2007 | Leahy et al. | |
| 7,311,815 B2 | 12/2007 | Abazajian | |
| 7,314,503 B2 | 1/2008 | Landrum et al. | |
| 7,351,751 B2 | 4/2008 | Acuri et al. | |
| 7,442,231 B2 | 10/2008 | Landrum | |
| 7,776,207 B2 | 8/2010 | Abhari et al. | |
| 7,846,323 B2 | 12/2010 | Abhari et al. | |
| 7,928,035 B2 | 4/2011 | Robota et al. | |
| 7,968,757 B2 | 6/2011 | Abhari et al. | |
| 2003/0233019 A1* | 12/2003 | Sherwood | C07C 2/76 585/418 |
| 2004/0167234 A1 | 8/2004 | Abazajian et al. | |
| 2004/0176654 A1 | 9/2004 | Abazajian | |
| 2004/0198618 A1 | 10/2004 | Abazajian et al. | |
| 2005/0016899 A1 | 1/2005 | Abazajian | |
| 2005/0043418 A1 | 2/2005 | Agee | |
| 2005/0063899 A1 | 3/2005 | Leahy | |
| 2005/0066577 A1 | 3/2005 | Arcuri | |
| 2005/0154069 A1 | 7/2005 | Inga et al. | |
| 2005/0165261 A1 | 7/2005 | Abazajian et al. | |
| 2005/0207970 A1 | 9/2005 | Garg et al. | |
| 2005/0222278 A1 | 10/2005 | Agee et al. | |
| 2005/0228060 A1 | 10/2005 | Inga | |
| 2005/0288541 A1* | 12/2005 | Sherwood | C07C 2/76 585/324 |
| 2007/0175799 A1 | 8/2007 | Tomlinson et al. | |
| 2007/0178339 A1 | 8/2007 | Freeks | |
| 2007/0209966 A1 | 9/2007 | Abhari | |
| 2007/0215521 A1 | 9/2007 | Havlik et al. | |
| 2007/0254968 A1 | 11/2007 | Agee et al. | |
| 2007/0259973 A1 | 11/2007 | Agee et al. | |
| 2008/0021118 A1 | 1/2008 | Inga et al. | |
| 2008/0028631 A1 | 2/2008 | Leahy | |
| 2008/0028634 A1 | 2/2008 | Leahy | |
| 2008/0083651 A1 | 4/2008 | Abhari et al. | |
| 2008/0161427 A1 | 7/2008 | Agee et al. | |
| 2008/0188576 A1 | 8/2008 | Tomlinson et al. | |
| 2008/0307827 A1 | 12/2008 | Hino et al. | |
| 2009/0031755 A1* | 2/2009 | Amsyari | F25J 1/0022 62/613 |
| 2010/0193129 A1 | 8/2010 | Tabata et al. | |

OTHER PUBLICATIONS

Dorschner, H. et al.; Electron Beam Facility in Polymer Research: Radiation Induced Functionalization of Polytetrafluoroethylene; Nuclear Instruments and Methods in Physics Research B 139 (1998); pp. 495-501.

Ponomarev, A.; Gas-To-Liquid Transformation of Alkanes by Electron-Beam Irradiation; Science Direct; Mendeleev Commun., 2006, 16(5); pp. 256-258.

Scarduelli, G. et al.; Methane Oligomerization in a Dielectric Barrier Discharge At Atmospheric Pressure; Plasma Process, Polym. 2009, 6; Wiley-VCH Berlag GmbH & Co. KGA, Weinheim; pp. 27-33.

Indarto, A. et al.; Kinetic Modeling of Plasma Methane Conversion in a Dielectric Barrier Discharge; Fuel Processing Technology 89 (2008) Elsevier B.V.; pp. 214-219.

\* cited by examiner

SYSTEM AND METHOD FOR CONVERTING GASEOUS HYDROCARBON MIXTURES INTO HIGHLY-BRANCHED HYDROCARBONS USING ELECTRON BEAM COMBINED WITH ELECTRON BEAM-SUSTAINED NON-THERMAL PLASMA DISCHARGE

PRIORITY INFORMATION

This application is a divisional of co-pending U.S. patent application Ser. No. 14/076,122, filed on Nov. 8, 2013, said U.S. patent application Ser. No. 14/076,122, filed on Nov. 8, 2013, is a divisional of U.S. patent application Ser. No. 13/552,831, filed on Jul. 19, 2012 (now abandoned). This application claims priority, under 35 U.S.C. § 120, from co-pending U.S. patent application Ser. No. 14/076,122, filed on Nov. 8, 2013. The entire content of co-pending U.S. patent application Ser. No. 14/076,122, filed on Nov. 8, 2013, is hereby incorporated by reference.

Co-pending U.S. patent application Ser. No. 14/076,122, filed on Nov. 8, 2013, claimed priority, under 35 U.S.C. § 120, from U.S. patent application Ser. No. 13/552,831, filed on Jul. 19, 2012. This application claims priority, under 35 U.S.C. § 120, from U.S. patent application Ser. No. 13/552,831, filed on Jul. 19, 2012. The entire content of co-pending U.S. patent application Ser. No. 13/552,831, filed on Jul. 19, 2012, is hereby incorporated by reference.

Co-pending U.S. patent application Ser. No. 13/552,831, filed on Jul. 19, 2012, claimed priority, under 35 U.S.C. § 119(e), from U.S. Provisional Patent Application Ser. No. 61/509,152, filed on Jul. 19, 2011; U.S. Provisional Patent Application Ser. No. 61/510,772, filed on Jul. 22, 2011; and U.S. Provisional Patent Application Ser. No. 61/673,064, filed on Jul. 18, 2012.

This application claims priority from U.S. Provisional Patent Application Ser. No. 61/509,152, filed on Jul. 19, 2011. The entire content of U.S. Provisional Patent Application Ser. No. 61/509,152, filed on Jul. 19, 2011, is hereby incorporated by reference.

This application claims priority from U.S. Provisional Patent Application Ser. No. 61/510,772, filed on Jul. 22, 2011. The entire content of U.S. Provisional Patent Application Ser. No. 61/510,772, filed on Jul. 22, 2011, is hereby incorporated by reference.

This application claims priority from U.S. Provisional Patent Application Ser. No. 61/673,064, filed on Jul. 18, 2012. The entire content of U.S. Provisional Patent Application Ser. No. 61/673,064, filed on Jul. 18, 2012, is hereby incorporated by reference.

BACKGROUND

Utilizing conventional refining methods and processes, only about 30-40% of a single barrel of crude petroleum can be effectively converted (cracked) into gasoline. With the higher demands for carbon-based energy products, such as gasoline, it is desirable to convert a greater percentage of the crude petroleum into gasoline.

To realize a higher yield of gasoline, the less valuable petroleum fractions of the refining process, such as naphta and alkenes (unsaturated hydrocarbons) and bitumen, should be converted to gasoline.

More specifically, it would be desirable to provide a process that enables the conversion of less valuable petroleum fractions of the refining process into high octane gasoline-like mixtures of highly-branched saturated hydrocarbons (alkanes).

Another issue is utilization of newly discovered deposits of natural gas for production of transportation fuels. Indeed, natural gas converted to higher molecular weight hydrocarbons provides a viable alternative to crude oil not only as a source for transportation fuels but also as the source of highly valuable and easily transportable specialty chemical products.

A further issue with utilization of crude petroleum as a source of energy is the results of spills. Oil spills are a source of undesired pollution to the surrounding environment which needs to be cleaned up, especially if the oil spill occurs in a body of water.

One conventional method for cleaning up oil spills in water is to add toxic materials to break up the oil, causing the oil to submerge and disperse. However, although the oil spill may appear gone, the oil has merely gone deeper, thereby making it more difficult to effectively collect and clean-up.

Therefore, it is desirable to provide a more efficient and less toxic method of water remediation in the oil drilling industry, in shale processing, in tanker clean-up, and in water processing on land, both of recovered water from oil removal, semi-conductor water treatment, municipal water treatment, mining operations, and toxic remediation of an environmentally damaged site.

BRIEF DESCRIPTION OF THE DRAWINGS

The drawings are only for purposes of illustrating various embodiments and are not to be construed as limiting, wherein.

DETAILED DESCRIPTION

Figure 1:
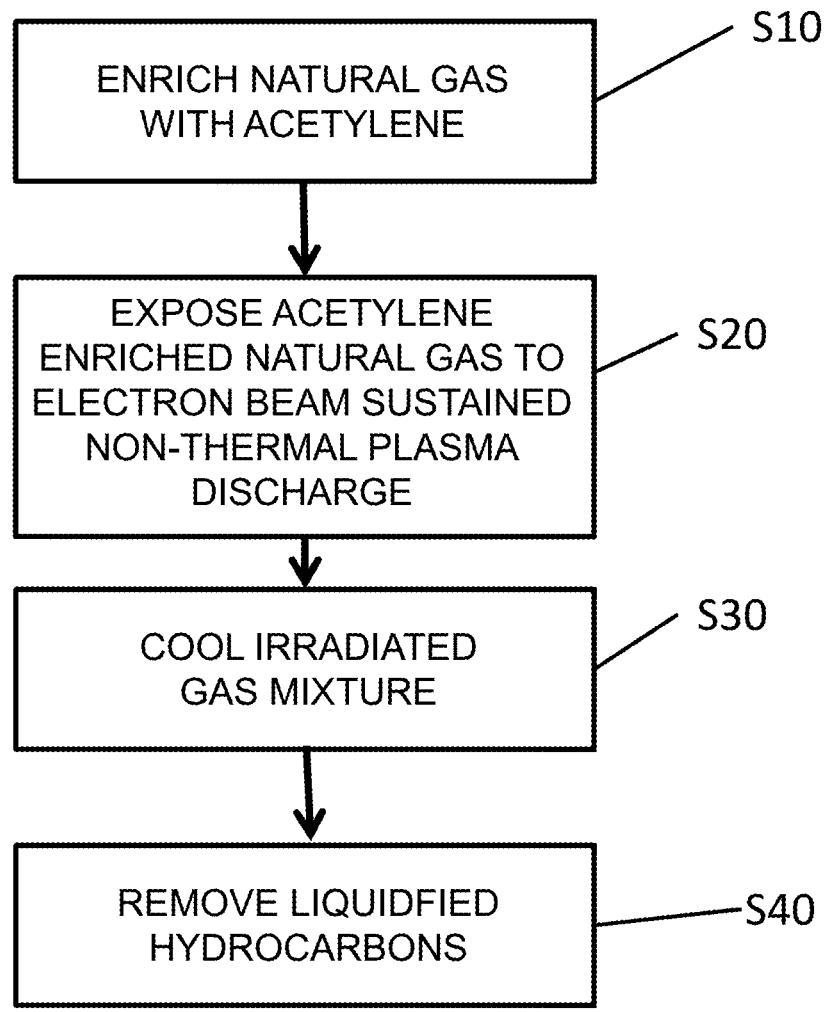
FIG. 1 illustrates a flowchart showing an example of a process for converting natural gas to liquidized highly-branched hydrocarbons.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

As illustrated in FIG. 1, natural gas is enriched with acetylene, at step S10. It is noted that the natural gas may comprise methane gas. Moreover, the natural gas may comprise a gaseous mixture of methane, ethane, propane, butane, and pentane, or any combination thereof.

The enriched gaseous mixture (natural gas and acetylene) is irradiated by electron beam or exposed to an electron beam sustained non-thermal plasma discharge, at step S20. It is noted that the electron beam may be a 1.0-2.5 MeV electron beam.

Below is a chemical representation of the introduction of an electron beam or electron beam sustained non-thermal plasma discharge to a gaseous mixture of low molecular weight hydrocarbons:

$$CH_4+C_2H_6+C_3H_8+C_4H_{10}+C_5H_{12}+e^-$$

By exposing the gaseous mixture to the electron beam or an electron beam sustained non-thermal plasma discharge, the low molecular weight hydrocarbons, interact with electron beam generated molecular ions and radicals to create liquefiable higher molecular weight highly-branched hydrocarbons. In this conversing process, light alkyne and alkene additives as well their molecular ions and radicals act as an effective carbon oligomerization and branching agents.

Below is a structural representation of an example of a liquefiable higher molecular weight highly-branched hydrocarbon:

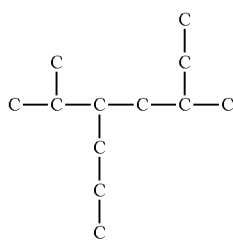

It is noted that hydrogen may be a byproduct of the irradiation and conversion process. Between steps S25 and S30, this hydrogen is separated and removed from the irradiated gaseous mixture to further promote formation of liquefiable higher molecular weight highly-branched hydrocarbons.

It is further noted that if the liquefiable higher molecular weight highly-branched hydrocarbons are mostly unsaturated hydrocarbons, as in the case of pyrolysis oil vapors, the resulting mixture can be enriched with hydrogen and re-exposed to the electron beam/electron beam sustained non-thermal plasma discharge to further crack and saturate the hydrocarbons.

At step S30, the converted product is cooled so that the liquefiable higher molecular weight highly-branched hydrocarbons are condensed for removal, at step S40, as higher molecular weight highly-branched hydrocarbons or highly-branched alkanes. The removed highly-branched hydrocarbons have a high octane value which can be used as an additive to or as gasoline. It is further noted that individual highly-branched alkanes can be further separated from the said mixture via distillation process and used as highly-valuable specialty chemicals.

The remaining gaseous mixture can be re-introduced into the process at step S10 and utilized as part of the base feedstock used to create the higher molecular weight highly-branched hydrocarbons.

Figure 2:
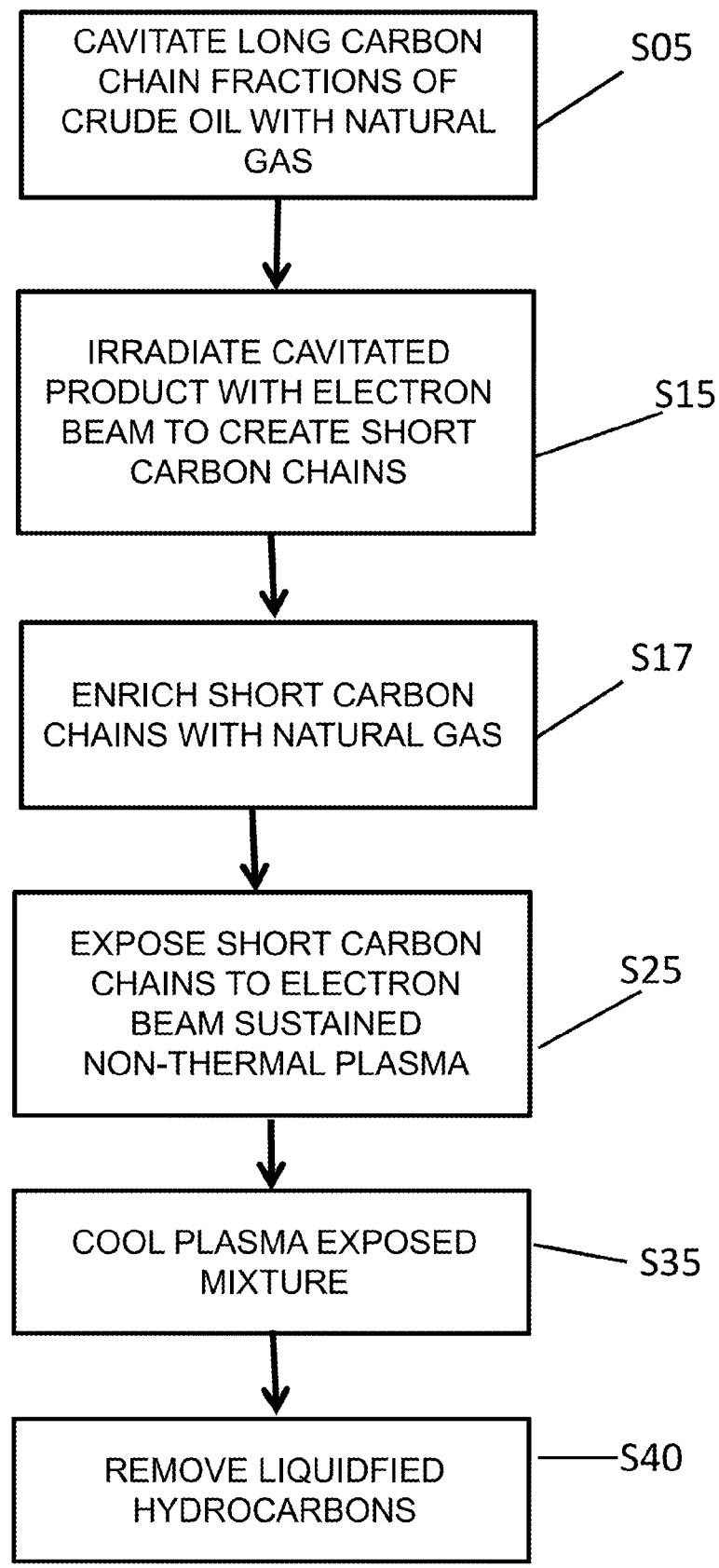
FIG. 2 illustrates a flowchart showing an example of a process for converting linear long carbon chain fractions of crude oil to liquidized highly-branched hydrocarbons.

As illustrated in FIG. 2, long carbon chain fractions of crude oil (liquid) are cavitated with natural gas, at step S05. A more thorough discussion of the cavitation process will be described below with respect to FIG. 7.

It is noted that the natural gas may comprise methane gas. Moreover, the natural gas may comprise a gaseous mixture of methane, ethane, propane, butane, and pentane, or any combination thereof.

It is further noted that the long carbon chain fractions of crude oil can be cavitated with natural gas.

The cavitation process adds "gas bubbles" to the long carbon chain fractions of crude oil, which enable a more effective penetration of an electron beam/electron beam sustained plasma discharge, as well as generation of highly reactive molecular ions and radicals inside said gas bubbles.

The cavitated mixture is discharged through a set of nozzles to create jets of droplets of long carbon chain fractions of crude oil. The discharging of the long carbon chain fractions of crude oil through the set of nozzles further cavitates the mixture before the mixture is irradiated by an electron beam or exposed to an electron beam sustained non-thermal plasma discharge, at step S15. It is noted that the electron beam may be a 1-5 MeV electron beam.

By exposing the jets of droplets of cavitated mixture to the electron beam or electron-beam combined with non-thermal plasma discharge, the long carbon chain fractions are broken down (cracked) to shorter carbon chains.

Most of the produced shorter carbon chains will have less than nine carbons and thus have a lower boiling points ($T_b$<126° C.), allowing them to evaporate out of the mixture and captured for further processing. These shorter carbon chains ($C_1$ through $C_8$) become gaseous after preheating and subsequent irradiation by the electron beam/electron beam sustained non-thermal plasma discharge.

The shortened carbon chains that have more than eight carbons remain in a liquid state and are fed back to the cavitation process of step S05, while the gaseous shorter carbon chains are fed to a second cavitation process being further enriched with natural gas at step S17.

At step S17, the gaseous shorter carbon chains are enriched with natural gas. It is noted that the natural gas may comprise methane gas. Moreover, the natural gas may comprise a gaseous mixture of methane, ethane, propane, butane, and pentane, or any combination thereof. Lastly, it is noted that the gaseous shorter carbon chains may be enriched with light alkynes (acetylene, etc.) and/or light alkenes (ethylene, etc.).

The enriched gaseous mixture is irradiated or exposed to an electron beam/electron beam sustained non-thermal plasma discharge, at step S25. It is noted that the electron beam may be a 1.0-5.0 MeV electron beam.

By exposing the gaseous mixture to the electron beam/electron beam sustained non-thermal plasma discharge, the carbons based compounds interact to create liquefiable higher molecular weight highly-branched hydrocarbons. In this reaction, admixture of light alkynes and alkenes, as well its molecular ions and radicals, can act as an effective carbon oligomerization and branching agents.

It is noted that hydrogen may be a byproduct of the irradiation and conversion process. Between steps S25 and S30, this hydrogen is separated and removed from the irradiated gaseous mixture to further promote formation of liquefiable higher molecular weight highly-branched hydrocarbons.

It is further noted that if the liquefiable higher molecular weight highly-branched hydrocarbons are mostly unsaturated hydrocarbons, as in the case of pyrolysis oil vapors, the resulting mixture can be enriched with hydrogen and re-exposed to the electron beam/electron beam sustained non-thermal plasma discharge to further crack and saturate the hydrocarbons.

At step S35, the converted product is cooled so that the liquefiable higher molecular weight highly-branched hydrocarbons are condensed for removal, at step S40, as higher molecular weight highly-branched hydrocarbons or highly-branched alkanes. The removed liquid mixture of highly-branched hydrocarbons, having a high octane value, can be used as an additive to or as gasoline. It is further noted that individual highly-branched alkanes can be further separated from the said mixture via distillation process and used as highly-valuable specialty chemicals.

The remaining gaseous mixture can be re-introduced into the process at step S17 or step S05 and utilized as part of the base feedstock used to create the higher molecular weight highly-branched hydrocarbons.

Figure 3:
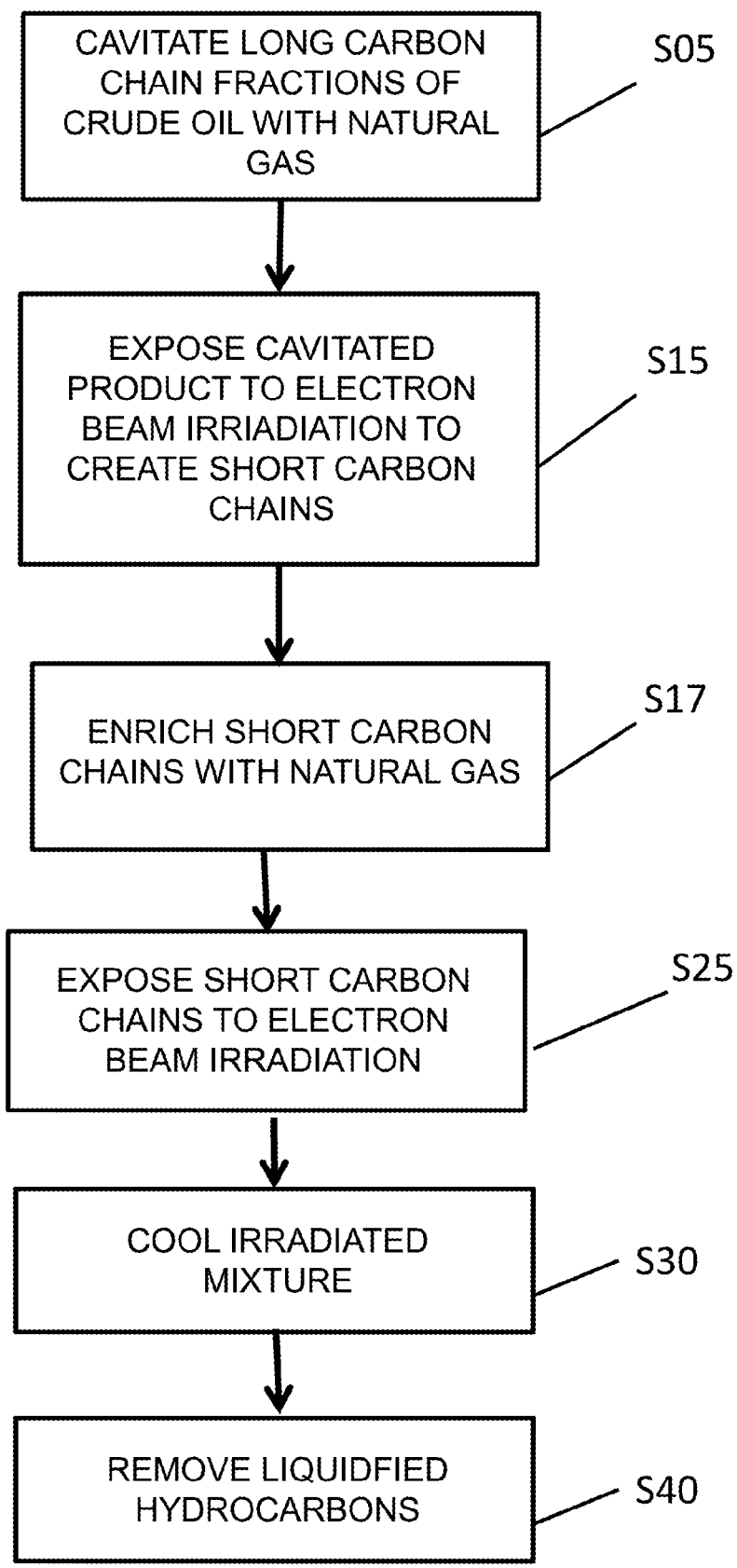
FIG. 3 illustrates a flowchart showing another example of a process for converting linear long carbon chain fractions of crude oil to liquidized highly-branched hydrocarbons.

As illustrated in FIG. 3, long carbon chain fractions of crude oil (liquid) are cavitated with natural gas, at step S05. It is noted that the natural gas may comprise methane gas. Moreover, the natural gas may comprise a gaseous mixture of methane, ethane, propane, butane, and pentane, or any combination thereof.

It is further noted that the long carbon chain fractions of crude oil can be cavitated with air.

The cavitation process adds "gas bubbles" to the long carbon chain fractions of crude oil, which enable a more effective penetration of an electron beam sustained plasma discharge.

The cavitated mixture is discharged through a set of nozzles to create jets of long carbon chain fractions of crude oil. The discharging of the long carbon chain fractions of crude oil through the set of nozzles further cavitates the mixture before the mixture is irradiated or exposed to an electron beam, at step S15. It is noted that the electron beam may be a 1-5 MeV electron beam.

By exposing the jets of cavitated mixture to the electron beam, the long carbon chain fractions are broken down (converted) to shorter carbon chains.

Most of the produced shorter carbon chains will have less than nine carbons and thus have lower boiling points, allowing them to evaporate out of the mixture and captured for further processing. These shorter carbon chains ($C_1$ through $C_8$) become gaseous after preheating and subsequent irradiation by the electron beam/electron beam sustained non-thermal plasma discharge.

The shorter carbon chains that have more than eight carbons ($>C_8$) remain in a liquid state and are fed back to the cavitation process of step S05, while the gaseous shorter carbon chains are fed to a second cavitation process at step S17.

At step S17, the gaseous shorter carbon chains are enriched with natural gas. It is noted that the natural gas may comprise methane gas. Moreover, the natural gas may comprise a gaseous mixture of methane, ethane, propane, butane, and pentane, or any combination thereof. Lastly, it is noted that the gaseous shorter carbon chains may be enriched with acetylene.

The enriched gaseous mixture is irradiated or exposed to an electron beam, at step S25. It is noted that the electron beam may be a 1-5 MeV electron beam.

By exposing the gaseous mixture to the electron beam, the carbons based compounds interact to create liquefiable higher molecular weight highly-branched hydrocarbons. In this reaction, acetylene can act as an effective carbon branching agent.

It is further noted that if the liquefiable higher molecular weight highly-branched hydrocarbons are mostly unsaturated hydrocarbons, the resulting mixture can be enriched with hydrogen and re-exposed to the electron beam sustained non-thermal plasma discharge to saturate the hydrocarbons.

It is noted that hydrogen may be a byproduct of irradiation and conversion process. This hydrogen can be utilized in a subsequent irradiation event to saturate the liquefiable higher molecular weight highly-branched hydrocarbons.

At step S30, the converted product is cooled so that the liquefiable higher molecular weight highly-branched hydrocarbons are condensed for removal, at step S40, as higher molecular weight highly-branched hydrocarbons or highly-branched alkanes. The removed highly-branched hydrocarbons have a high octane value which can be used as an additive to or as gasoline.

The remaining gaseous mixture can be re-introduced into the process at step S17 or step S05 and utilized as part of the base product used to create the higher molecular weight highly-branched hydrocarbons.

Figure 4:
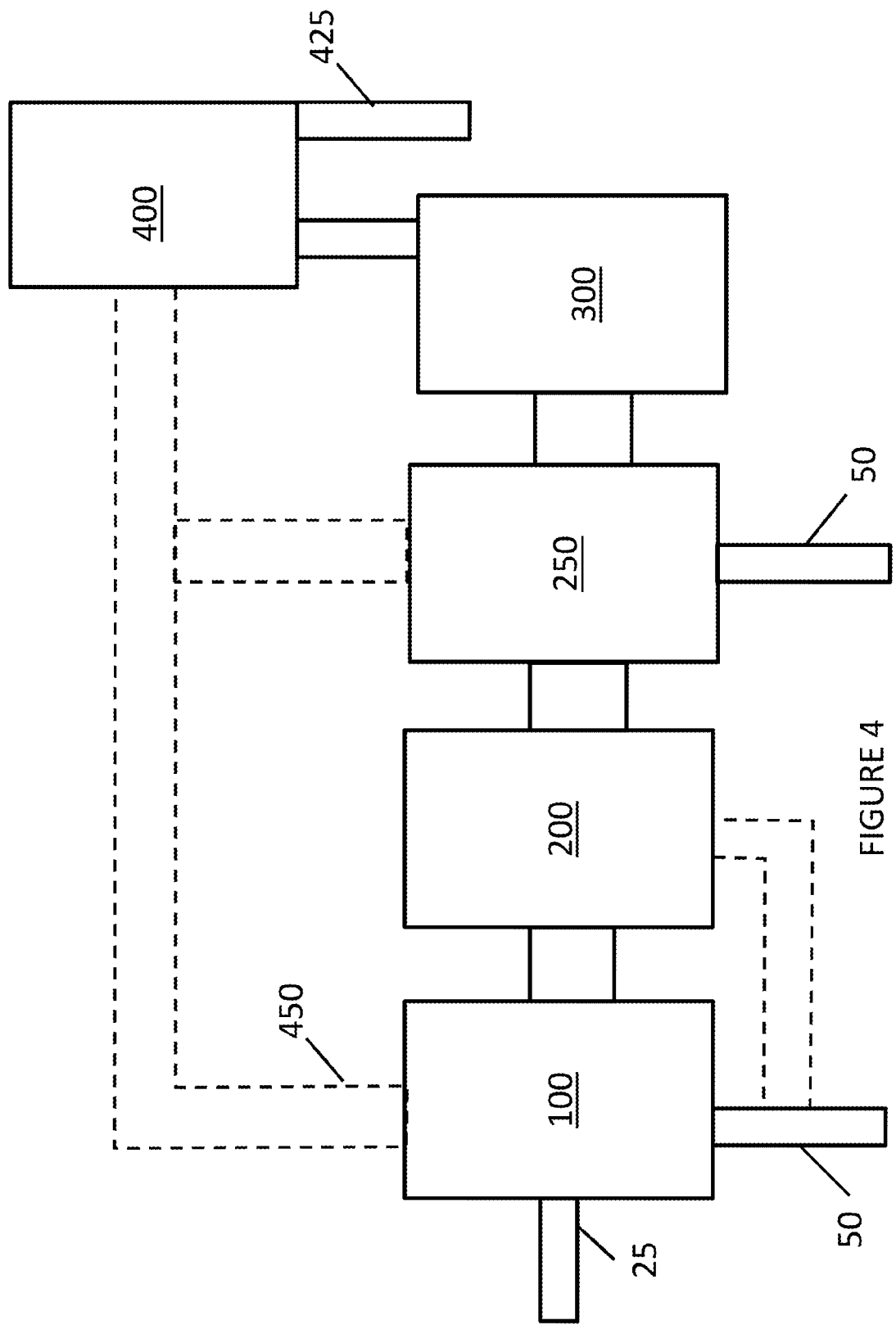
FIG. 4 illustrates a block diagram of a system for converting natural gas or long carbon chain fractions of crude oil to liquidized highly-branched hydrocarbons.

In FIG. 4, cavitation device 100 cavitates long carbon chain fractions of crude oil (liquid), received through conduit 25, with natural gas, received through conduit 50. It is noted that the natural gas may comprise methane gas. Moreover, the natural gas may comprise a gaseous mixture of methane, ethane, propane, butane, and pentane, or any combination thereof.

It is further noted that the long carbon chain fractions of crude oil can be cavitated with air.

The cavitation process adds "gas bubbles" to the long carbon chain fractions of crude oil, which enable a more effective penetration of an electron beam/electron beam sustained plasma discharge.

The cavitated mixture is discharged through a set of nozzles to create jets of droplets of long carbon chain fractions of crude oil. The discharging of the long carbon chain fractions of crude oil through the set of nozzles further cavitates the mixture before the mixture is irradiated or exposed to an electron beam or electron beam sustained non-thermal plasma discharge in radiation chamber 200. It is noted that the electron beam may be a 1-5 MeV electron beam.

By exposing the jets of cavitated mixture to the electron beam, the long carbon chain fractions are broken down (cracked) to shorter carbon chains.

Most of the produced shorter carbon chains will have less than nine carbons and thus have lower boiling points, allowing them to evaporate out of the mixture and captured for further processing. These shorter carbon chains ($C_1$ through $C_8$) become gaseous after preheating and subsequent irradiation by the electron beam/electron beam sustained non-thermal plasma discharge.

The shorter carbon chains that have more than eight carbons ($>C_8$) remain in a liquid state and can be optionally fed back to the cavitation device 100, while the gaseous shorter carbon chains are fed to a second cavitation device 250.

In the second cavitation device 250, the gaseous shorter carbon chains are enriched with natural gas. It is noted that the natural gas may comprise methane gas. Moreover, the natural gas may comprise a gaseous mixture of methane, ethane, propane, butane, and pentane, or any combination thereof. Lastly, it is noted that the gaseous shorter carbon chains may be enriched with light alkynes such as acetylene and alkenes such as ethylene.

The enriched gaseous mixture is irradiated or exposed to an electron beam or electron beam sustained non-thermal plasma discharge in a second radiation chamber 300. It is noted that the electron beam may be a 1-5 MeV electron beam.

By exposing the gaseous mixture to the electron beam, the carbons based compounds interact to create liquefiable higher molecular weight highly-branched hydrocarbons. In this reaction, admixture of light alkynes and alkenes, as well its molecular ions and radicals, can act as an effective carbon oligomerization and branching agents.

It is further noted that if the liquefiable higher molecular weight highly-branched hydrocarbons are mostly unsaturated hydrocarbons, the resulting mixture can be enriched with hydrogen and re-exposed to the electron beam sustained non-thermal plasma discharge to saturate the hydrocarbons.

It is noted that hydrogen may be a byproduct of irradiation and conversion process. This hydrogen can be utilized in a subsequent irradiation event to saturate the liquefiable higher molecular weight highly-branched hydrocarbons.

In the cooling/extraction device 400, the converted product is cooled so that the liquefiable higher molecular weight highly-branched hydrocarbons are condensed for removal, through conduit 425, as higher molecular weight highly-branched hydrocarbons or highly-branched alkanes. The removed highly-branched hydrocarbons have a high octane value which can be used as an additive to or as gasoline.

The remaining gaseous mixture can be re-introduced into the process at cavitation device 100 or second cavitation device 250, via conduit 450, and utilized as part of the base product used to create the higher molecular weight highly-branched hydrocarbons.

Figure 5:
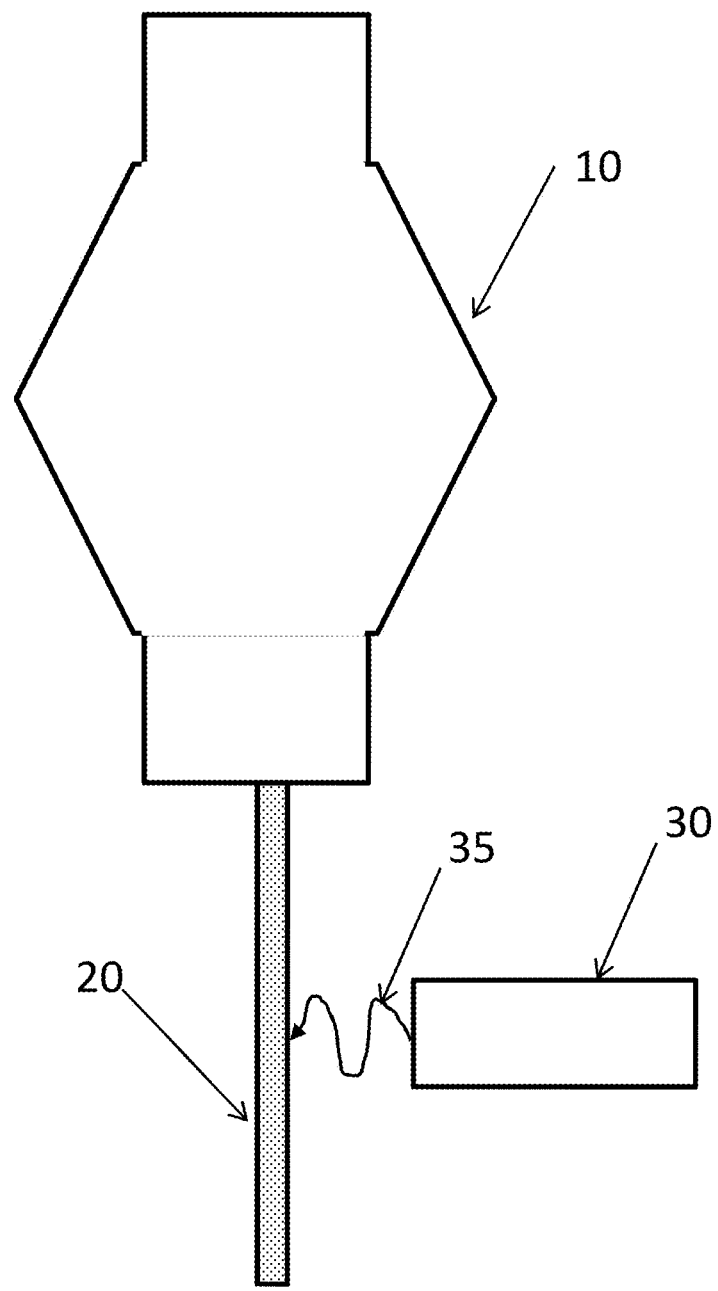
FIG. 5 illustrates a block diagram of a cavitation system and an electron beam/electron beam sustained non-thermal plasma discharge system.

Cavitation device 10 of FIG. 5, cavitates long carbon chain fractions of crude oil (liquid), with natural gas. It is noted that the natural gas may comprise methane gas. Moreover, the natural gas may comprise a gaseous mixture of methane, ethane, propane, butane, and pentane, or any combination thereof.

It is further noted that the long carbon chain fractions of crude oil can be cavitated with air.

The cavitation process adds "gas bubbles" to the long carbon chain fractions of crude oil, which enable a more effective penetration of an electron beam sustained plasma discharge.

The cavitated mixture is discharged through a set of nozzles to create jets of droplets (20) of long carbon chain fractions of crude oil. The discharging of the long carbon chain fractions of crude oil through the set of nozzles further cavitates the mixture before the mixture is irradiated by or exposed to electron beam or electron beam sustained non-thermal plasma discharge 35 generated by high voltage generator 30. It is noted that the electron beam may be a 1-5 MeV electron beam.

By exposing the jets (20) of cavitated mixture to the electron beam 35, the long carbon chain fractions are broken down (cracked) to shorter carbon chains.

Figure 6:
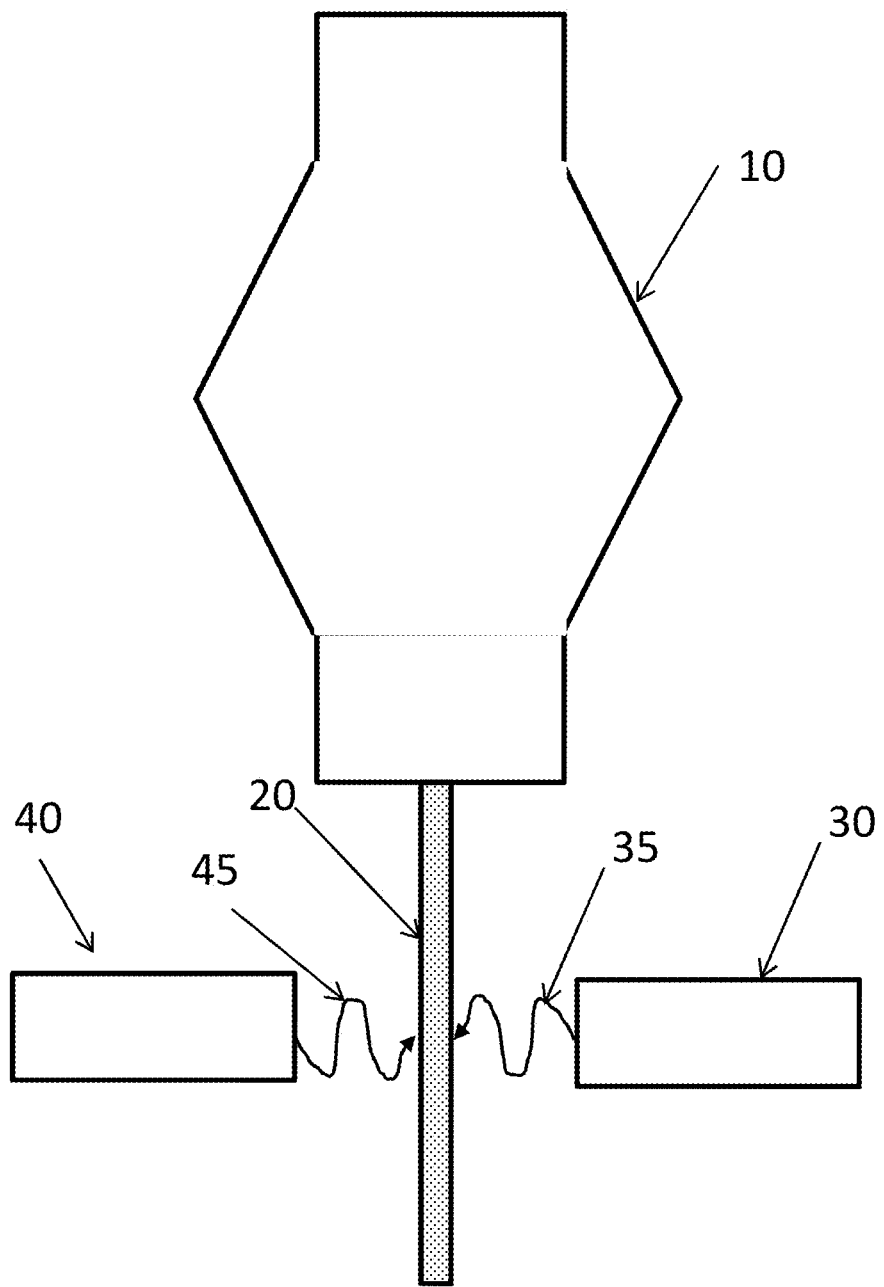
FIG. 6 illustrates a block diagram of a cavitation system and a dual electron beam/dual electron beam sustained non-thermal plasma discharge system.

Cavitation device 10 of FIG. 6, cavitates long carbon chain fractions of crude oil (liquid), with natural gas. It is noted that the natural gas may comprise methane gas. Moreover, the natural gas may comprise a gaseous mixture of methane, ethane, propane, butane, and pentane, or any combination thereof.

It is further noted that the long carbon chain fractions of crude oil can be cavitated with air.

The cavitation process adds "gas bubbles" to the long carbon chain fractions of crude oil, which enable a more effective penetration of an electron beam sustained plasma discharge.

The cavitated mixture is discharged through a set of nozzles to create jets of droplets (20) of long carbon chain fractions of crude oil. The discharging of the long carbon chain fractions of crude oil through the set of nozzles further cavitates the mixture before the mixture is irradiated or exposed to two electron beams or electron beam sustained non-thermal plasma discharges (35 and 45) generated by two high voltage generators (30 and 40). It is noted that the electron beams may be a 1-5 MeV electron beam.

By exposing the jets (20) of cavitated mixture to the electron beams (35 and 45), the long carbon chain fractions are broken down (converted) to shorter carbon chains.

Figure 7:
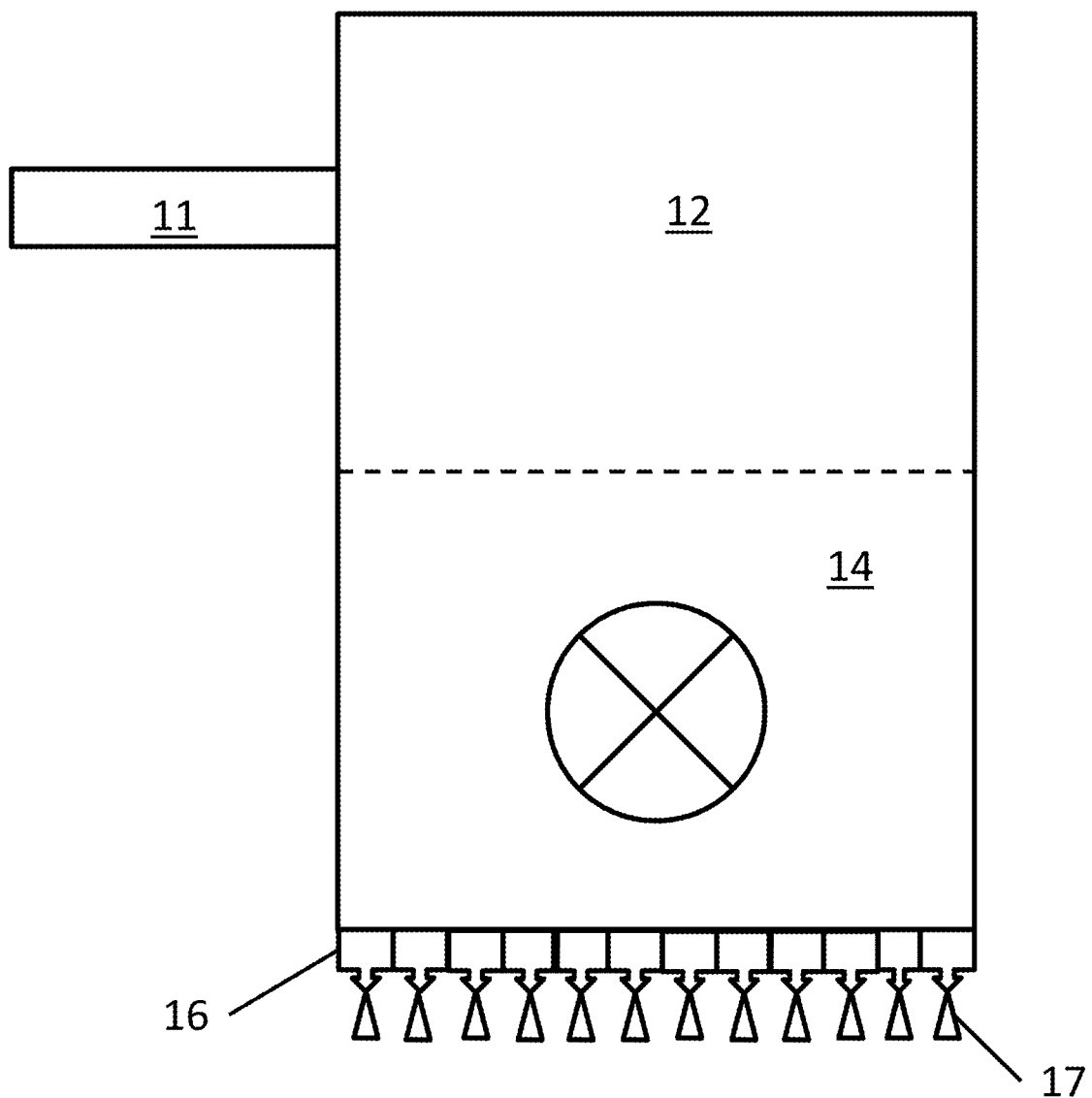
FIG. 7 illustrates a block diagram of a cavitation system.

FIG. 7 shows a more detail example of a cavitation device 10. The cavitation device 10 is divided into three stages or zones. In the first stage or zone 12, the cavitation device 10 cavitates long carbon chain fractions of crude oil (liquid), with natural gas, received by conduit 11. It is noted that the natural gas may comprise methane gas. Moreover, the natural gas may comprise a gaseous mixture of methane, ethane, propane, butane, and pentane, or any combination thereof.

It is further noted that the long carbon chain fractions of crude oil can be cavitated with air.

The first stage or zone 12 of the cavitation device 10 adds "gas bubbles" to the long carbon chain fractions of crude oil.

The cavitated mixture from the first stage or zone 12 of the cavitation device 10 is introduced into the second stage or zone 14 of the cavitation device 10. The second stage or zone 14 of the cavitation device 10 splits the "gas bubbles" from the first stage into smaller "gas bubbles." The smaller the "gas bubbles," the more effective the penetration of an electron beam/electron beam sustained plasma discharge will be.

The cavitated mixture from the second stage or zone 14 of the cavitation device 10 is discharged through a set of nozzles (16) to create jets (17) of long carbon chain fractions of crude oil. The discharging of the long carbon chain fractions of crude oil through the set of nozzles (16) further cavitates the mixture before the mixture is irradiated or exposed to an electron beam or electron beam sustained non-thermal plasma discharge.

In the various embodiments discussed above, natural gas can be converted to a mixture of highly-branched hydrocarbons, with average octane number as high as 110, which is virtually non-existent in crude oil. Since the mixture has a very high octane value, the liquid mixture can be utilized as an additive to various gasoline formulations.

Moreover, in the various embodiments discussed above, the described processes allow for the creation of a variety of outputs, including liquid fuels as well as other additive ingredients such as solvents, etc.

Although the various embodiments discussed above focused on the introduction of natural gas, other various feed stocks can be used. For example, adding a carrier gas, such as argon, may serve as an effective energy transfer agent increasing efficiency of polymerization of low molecular weight hydrocarbons into higher molecular weight hydrocarbons, while also protecting just synthesized higher molecular weight hydrocarbons from an immediate destruction by the electron beam or electron beam sustained plasma discharge.

It is noted that, in a full circulatory mode, a carrier gas remains in circulation as the carrier gas does not polymerize or condense in electron beam driven gas to liquid conversion process.

In addition, ethylene gas may be added to serve not only as additional energy transfer agent but also as an effective branching agent. However, as a branching agent, ethylene will be extended in the process; and therefore, the ethylene must be replenished together with natural gas. In this example, ethylene gas replaces acetylene gas mentioned as an oligomerization and branching additive in the previous embodiments.

Upon creating the mixture, the various individual components can be separated by simple distillation using a conventional distillation column process to separate each individual component from the entire mixture by heating the entire mixture up to the first distillation point and keeping the temperature at this point for some time to allow full evaporation of the first component with the lowest distillation temperature. The vapor of the first most volatile component is then removed vapor and then the temperature is raised further to the next distillation point. The process is repeated until the very last component with the highest temperature remains in its liquid phase.

A high purification process may be implemented to raise the purity of each distillated component up to a pharmaceutical grade by using microfiltration or even nano-filtration membranes as well as by other purification processes.

Another embodiment may include a serial circulation setup of electron beam irradiation units, wherein each electron beam irradiation unit is followed by a hydrogen gas separator that lets the carrier gas with vapors to pass-through, followed by a liquid fuel product condenser and finally by feed gas replenishment entrance before the next electron beam irradiation unit.

In the natural gas conversion to liquid fuels processes described above, the feed gases may include dry natural gas, wet natural gas, or associated petroleum gas. The energy transfer enhancing gaseous additives may include Argon, and the oligomerization and branching process enhancing gaseous additives may include light alkynes or alkenes.

The process can also be utilized in the process of cracking of a liquid hydrocarbon composition by converting certain products of conventional oil distillation; e.g., naphtha and others; into highly branched alkanes. With respect to naphtha, naphtha is heated only to the point of vaporization followed up by the electron beam process to realize the conversion of the obtained vapors mixed with natural gas and other enhancing gaseous additives into highly branched liquid alkanes.

Lastly, the process can be utilized in cleaning up industrial flue gases.

Figure 8:
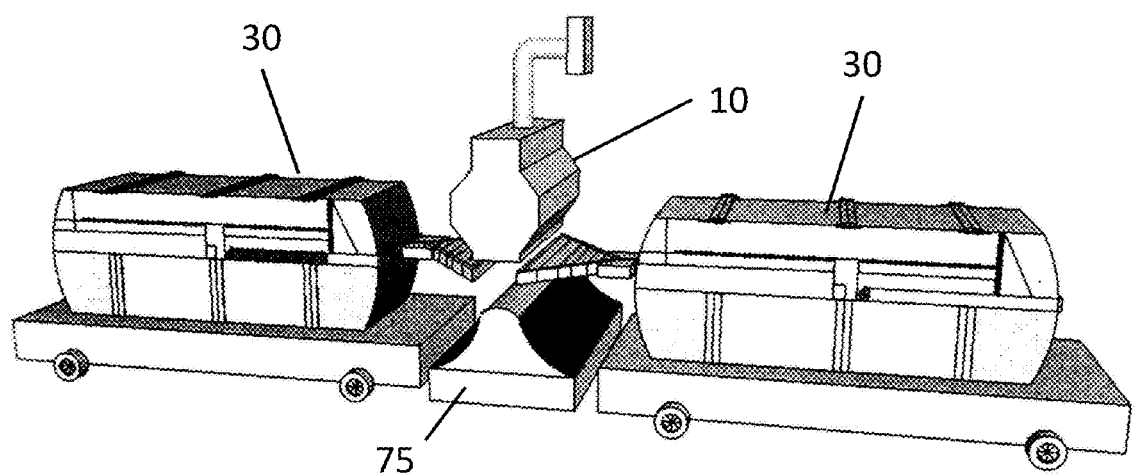
FIG. 8 illustrates a mobile cavitation/electron beam/electron beam-sustained non-thermal plasma discharge system.

FIG. 8 illustrates an example of a dual electron beam sustained plasma discharge system which can be utilized to separate oil from water or to treat contaminated water.

As illustrated in FIG. 8, two electron beam generators 30 are position opposite each other. Contaminated water (water/oil mixture) enters a cavitation unit 10 where the contaminated water is cavitated with air to create an air-bubble filled mixture. The cavitation process breaks up the bubbles down to small and smaller bubbles so that the effective surface area of the bubbles is increased.

In an oil recovery system, the oil will retain more of the bubbles than the water.

The cavitated mixture is ejected from the cavitation unit 10 through the utilization of jet nozzles (not shown) to further facilitate the cavitation of the mixture with more air and smaller bubbles.

As the mixture is ejects, the electron beam generators 30 irradiate the ejected mixture wherein the electron beam interacts with the air bubbles to generate ozone within the liquid water/oil droplets. The ozone can effectively breakdown the oil hydrocarbons within the water. In other words, the air bubbles act as internal ozone generation sites when irradiated by the electron beam.

It is further noted that while breaking down lighter components of crude oil electron beam irradiation of oil in water mixture also promotes effective consolidation of the heaviest components of crude oil such as asphaltenes and others into solid particulates.

Exposure of water/oil mixtures to the electron beam irradiation doses in excess of 30 kGy (1 kGy=1 kJ/kg) results in the effective precipitation of the solid particulates formed from said heaviest hydrocarbon fractions of crude oil.

The irradiated oil in water mixture passes over a filter 75 where the said heavy oil particulates can be effectively separated from the water.

It is noted that although FIG. 8 shows a horizontal electron beam system for irradiating a vertical path of a water mixture, the process is effective on a horizontal water path by merely rotating the electron beam system to create a vertical electron beam system.

Figure 9:
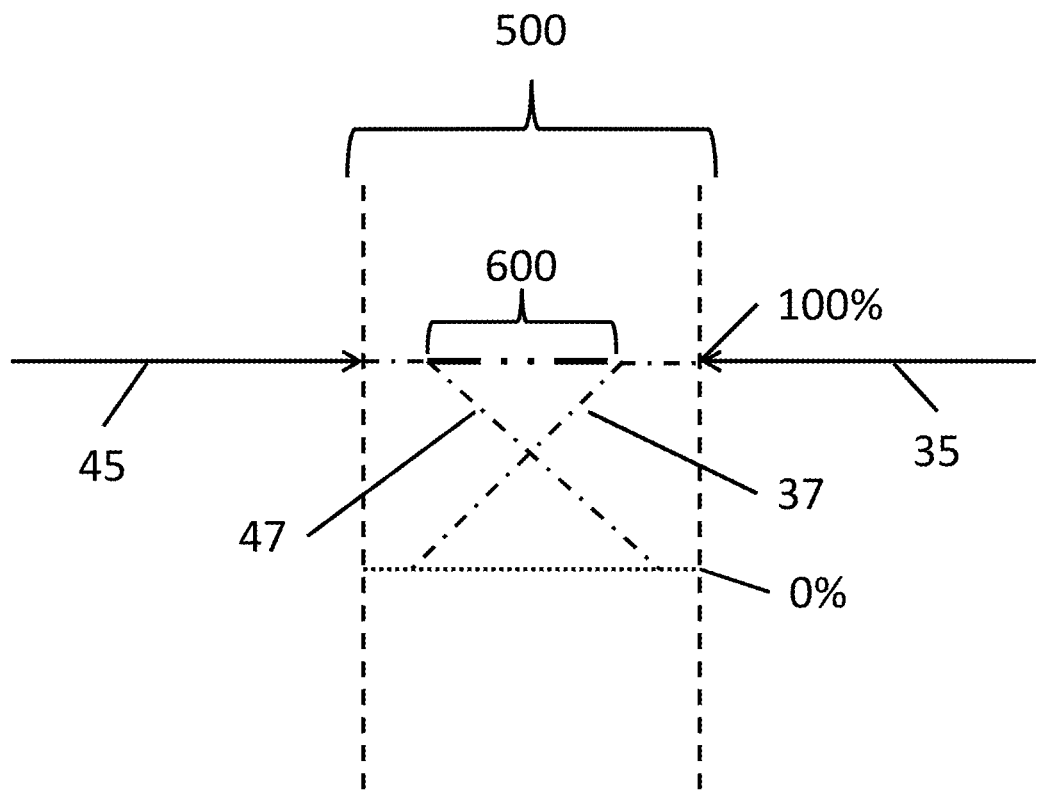
FIG. 9 illustrates an example of the effective power of a dual electron beam/dual electron beam sustained non-thermal plasma discharge system with respect to a jet of small drops of water.

FIG. 9 illustrates the effective power of a dual electron beam system with respect to the irradiated water column. For example, as the electron beam 45 traverses the water column 500, the effective power deposition of the electron beam 47 (dash/dot line) diminishes Moreover, as the electron beam 35 traverses the water column 500, the effective power deposition of the electron beam 37 (dash/dot line) diminishes. However, by utilizing a dual beam system, as illustrated in FIG. 8, the overall effective power deposition of the electron beams 600 (dash/dot/dot/dash line), upon individual diminishing, remains relatively high. Essentially, the entire column of water may experience electron beam irradiation at close to 100% utilization efficiency when utilizing a dual beam system. In one embodiment, the energy of the electron beam is 1.0 MeV.

Figure 16:
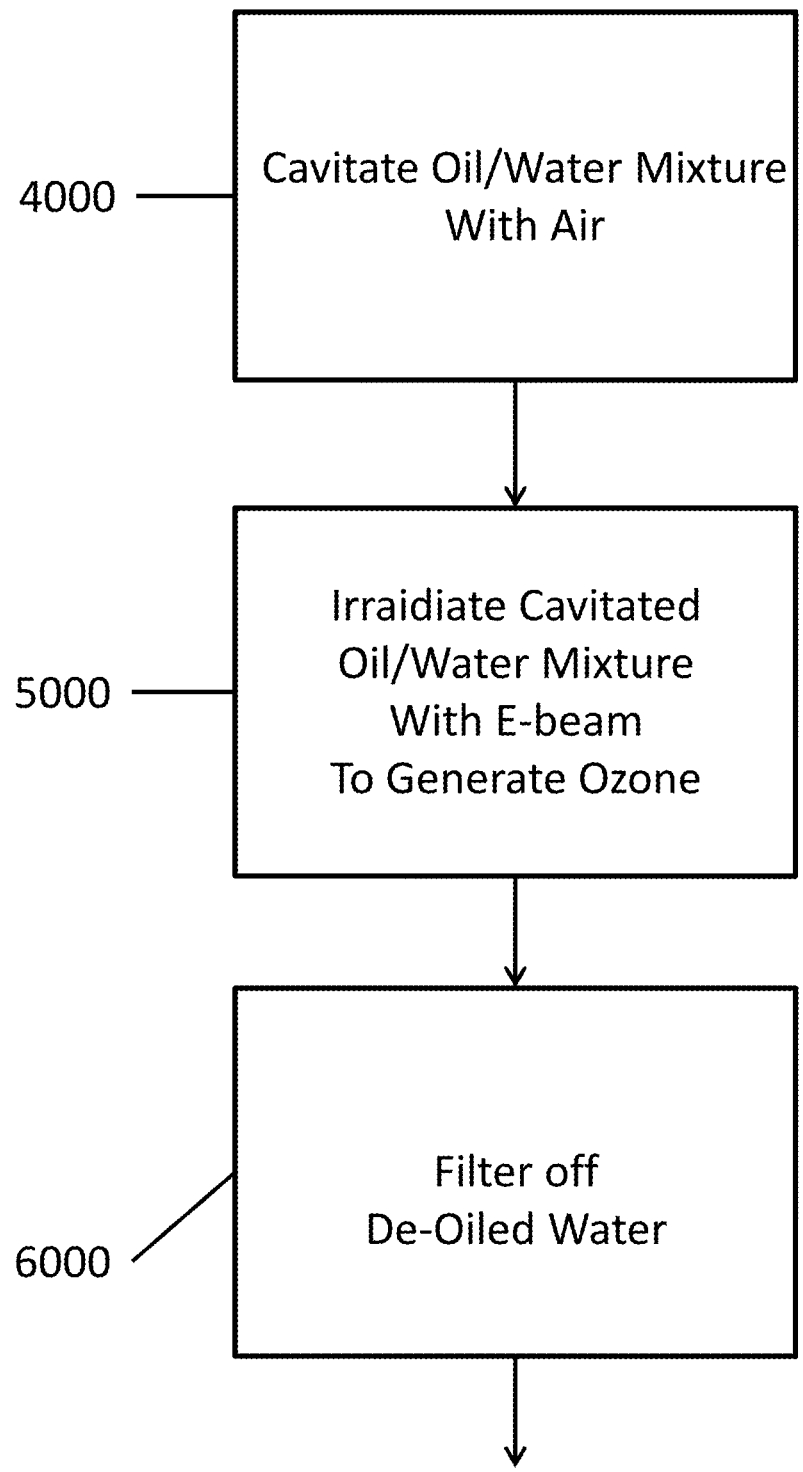
FIG. 16 illustrates a block diagram of an oil recovery system using an electron beam/electron beam sustained plasma discharge system.

FIG. 16 illustrates a block diagram of an oil recovery system using an electron beam sustained plasma discharge system.

As illustrated in FIG. 16, the oil/water mixture is cavitated with air by a cavitation unit 4000. The cavitated mixture is irradiated by an electron beam generation unit 5000. Thereafter, the irradiated mixture is filtered to remove the water, by filter 6000.

In one embodiment, the cavitation process can be realized in three zones or stages. In the first stage, air is introduced into the oil/ware mixture. The air may be explosively introduced to the mixture (high temperature and pressure). The first stage may create bubbles within the mixtures having a diameter from 500 to 1000 microns.

In the second stage, the mixture is agitated to split the bubbles to smaller and smaller sizes such that the bubbles have a diameter of about a few microns. Such small bubbles effectively increase the surface of the bubbles, thereby allowing a greater access of the ozone generated in the irradiation process to the oil contaminants in water.

In the third stage, the cavitated mixture is ejected through nozzles to add more air to the mixture and further split the bubbles. The jetted mixture provides greater air saturation, more effective penetration of the electron beam, and greater generation of ozone in atomized explosive bubbles.

The nozzles may be conventional expansion nozzles or air can be added in the jetting process (generating a jet spray).

The cavitation of air in the mixture and subsequent generation of ozone inside the microbubbles of cavitated air by high energy electrons enables to increase the throughput of decontamination of water mixtures by 2-fold and more compared to e-beam irradiation alone without cavitation of air at given power of the electron beam.

Figure 10:
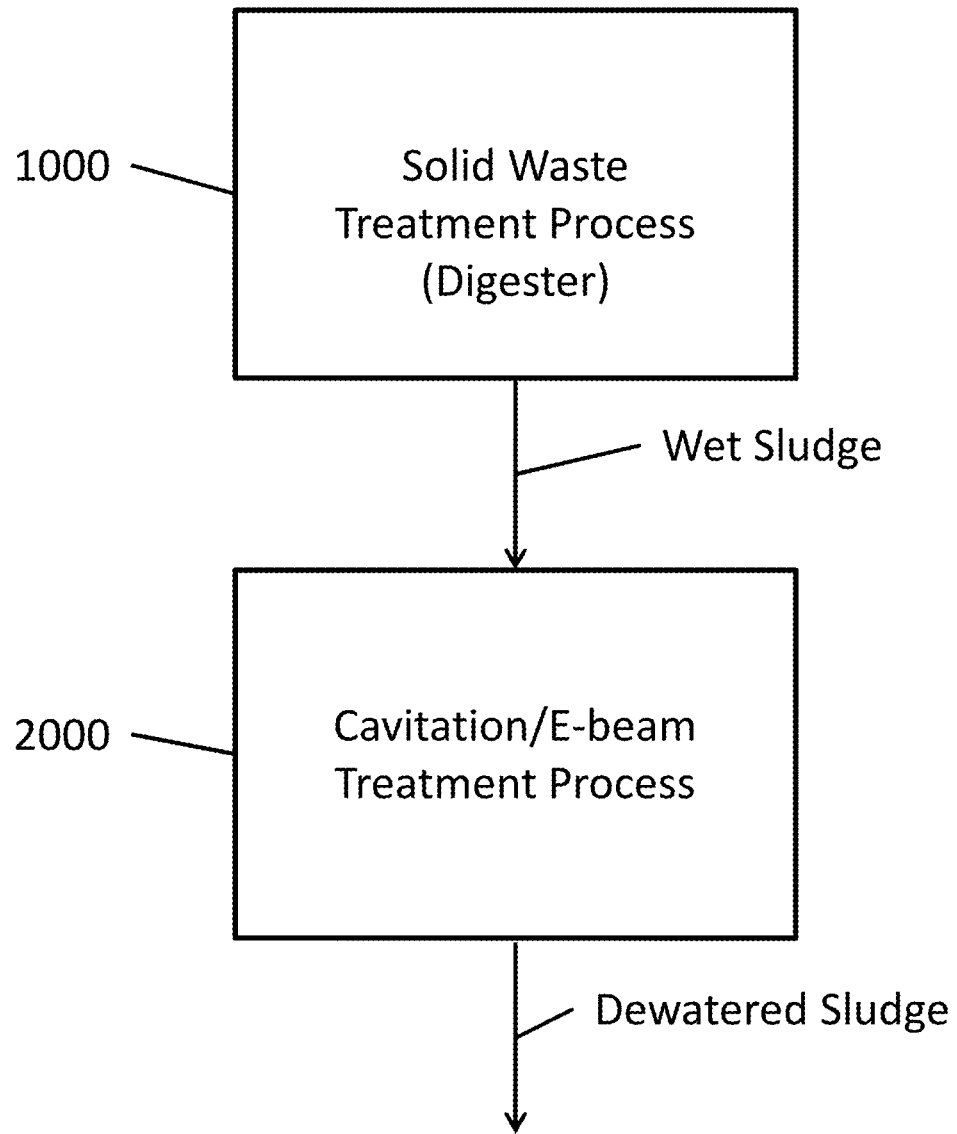
FIG. 10 illustrates a block diagram of an example of a solid waste treatment system using a cavitation/electron beam/electron beam sustained plasma discharge system.

FIG. 10 illustrates a block diagram system using a cavitation/electron beam process to treat solid waste (sludge). As illustrated, solid waste (wet sludge), which has been processed by a digester 1000, is fed to a cavitation/electron beam sustained plasma discharge unit 2000, where the wet sludge is cavitated and irradiated with an electron beam to produce dewatered sludge.

The electron beam and cavitation treatment of wet sludge (both municipal and industrial) results in significant dewatering of both inorganic sediment particulates and so called bio-solids from water bound to the outer surfaces and inner surfaces of the pores of such particles in wet sludge (2-3% of total solid content-TSC).

It is noted that the electron beam and cavitation treatment is also effective in removing bound water from partially dewatered (20-30% TSC) sludge coming from sludge dewatering centrifuges or belt presses.

It is also noted that just electron beam treatment, without cavitation, can provide sludge dewatering to a lower extent.

By utilizing electron beam treatment, significant energy savings can also be realized over conventional dewatering processes by centrifuges, as well as, shipping costs due to the significantly lower water content in the sludge.

Figure 11:
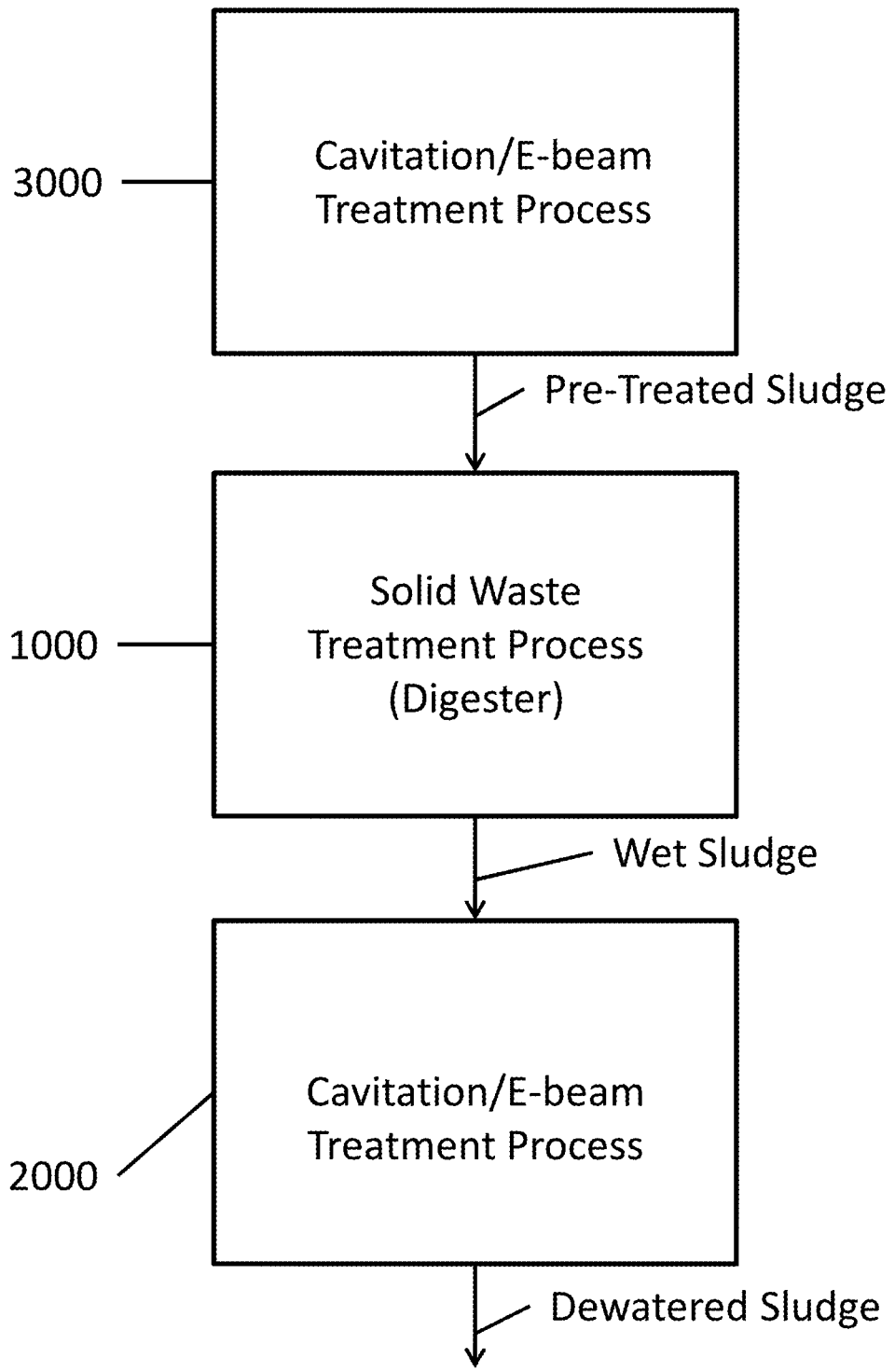
FIG. 11 illustrates a block diagram of another example of a solid waste treatment system using a cavitation/electron beam/electron beam sustained non-thermal plasma discharge system.

FIG. 11 illustrates another block diagram system using a cavitation/electron beam process to treat solid waste (sludge). In this system, a cavitation/electron beam sustained plasma discharge unit 3000 is introduced before the digester 1000.

The cavitation/electron beam sustained plasma discharge unit 3000 breaks up the sludge so that the sludge does not require the same amount of time in the digester 1000, thereby enabling the processing of more sludge during a given period of time.

As in FIG. 10, FIG. 11 illustrates that solid waste (wet sludge), which has been processed by a digester 1000, is fed to a cavitation/electron beam sustained plasma discharge unit 2000, where the wet sludge is cavitated and irradiated with an electron beam to produce dewatered sludge.

The electron beam and cavitation treatment of wet sludge (both municipal and industrial) results in significant dewatering of both inorganic sediment particulates and so called bio-solids from water bound to the outer surfaces and inner surfaces of the pores of such particles in wet sludge (2-3% of total solid content-TSC).

It is noted that the electron beam and cavitation treatment is also effective in removing water from partially dewatered (20-30% TSC) sludge coming from sludge dewatering centrifuges.

It is also noted that just electron beam treatment, without cavitation, can provide dewatering to a lower extent.

By utilizing electron beam treatment, significant energy savings can also be realized over conventional dewatering processes by centrifuges, as well as, shipping costs due to the lower water content in the sludge.

Figure 12:
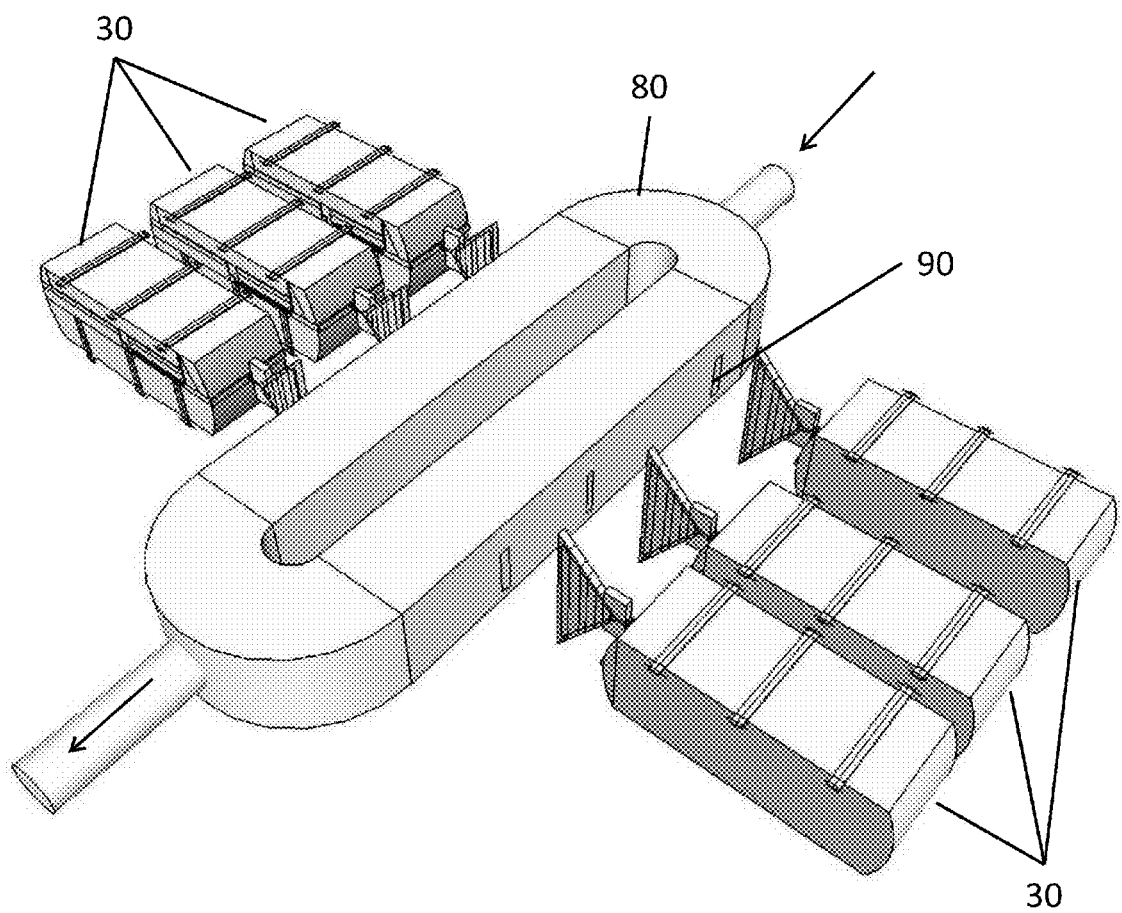
FIG. 12 illustrates an example of a multiple electron beam/multiple electron beam sustained non-thermal plasma discharge system.

FIG. 12 illustrates a multiple electron beam system. In this example, the mixture to be irradiated is introduced into an oval chamber 80. The chamber 80 includes windows 90 to allow irradiation by the electron beam generation units 30. The chamber 80 may also include cavitators (not shown) that cavitate the mixture between windows 90.

Figure 13:
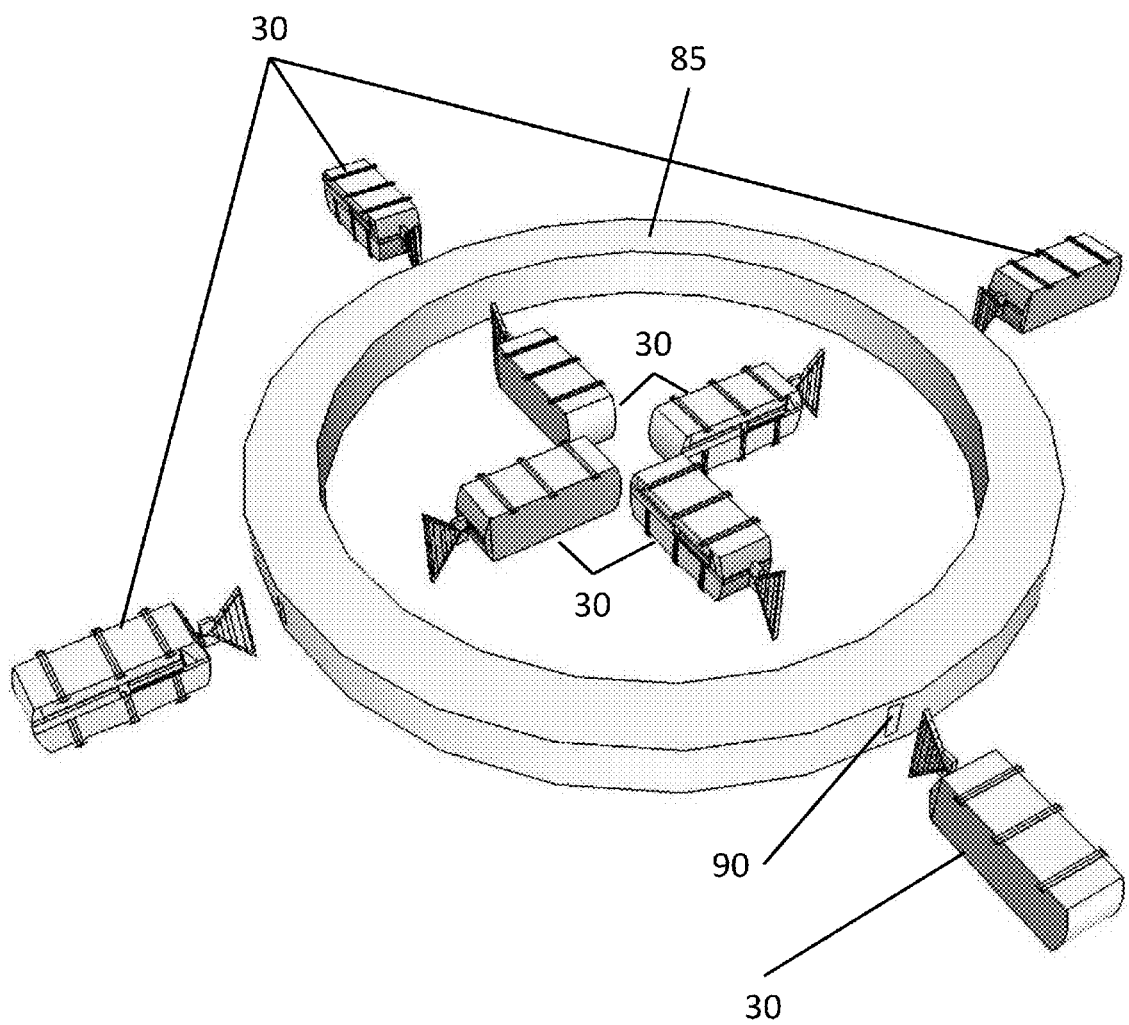
FIG. 13 illustrates another example of a multiple electron beam/multiple electron beam sustained plasma discharge system.

FIG. 13 illustrates another multiple electron beam system. In this example, the mixture to be irradiated is introduced into a circular chamber 85, through openings (not shown). The chamber 85 includes windows 90 to allow irradiation by the electron beam generation units 30. The chamber 85 may also include cavitators (not shown) that cavitate the mixture between windows 90.

Figure 14:
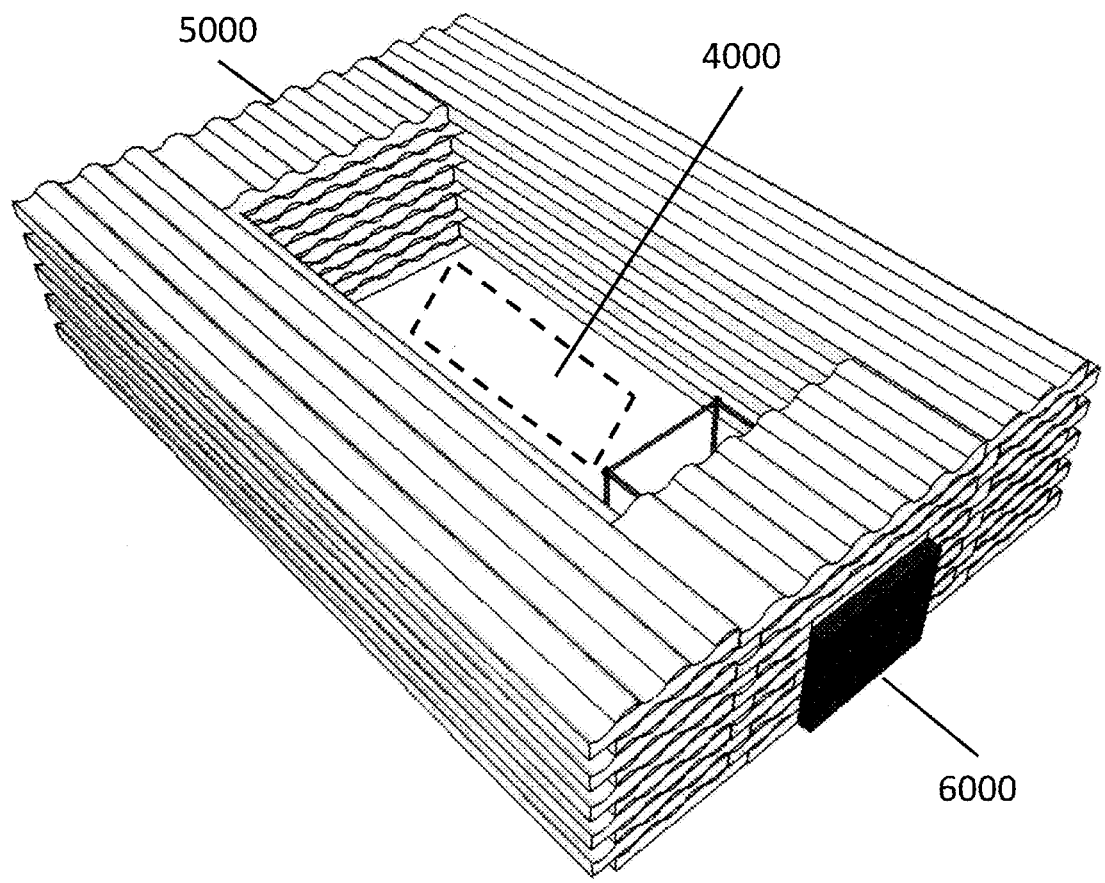
FIG. 14 illustrates an example of a portable shielding system for use with an electron beam/electron beam sustained plasma discharge system.

FIG. 14 illustrates a portable water shielding housing 5000 having a steel door 6000 to allow an entry way for personnel. This portable water shielding housing 5000 can be constructed to surround an electron beam generation unit 4000 so as to shield the environment from stray radiation. The housing may be constructed of bladders or pillows that can be filled on site with water to provide the shielding. The bladders and pillows are designed to interlock together so that when stack, the water-filled bladders or pillows create a stable wall.

Figure 15:
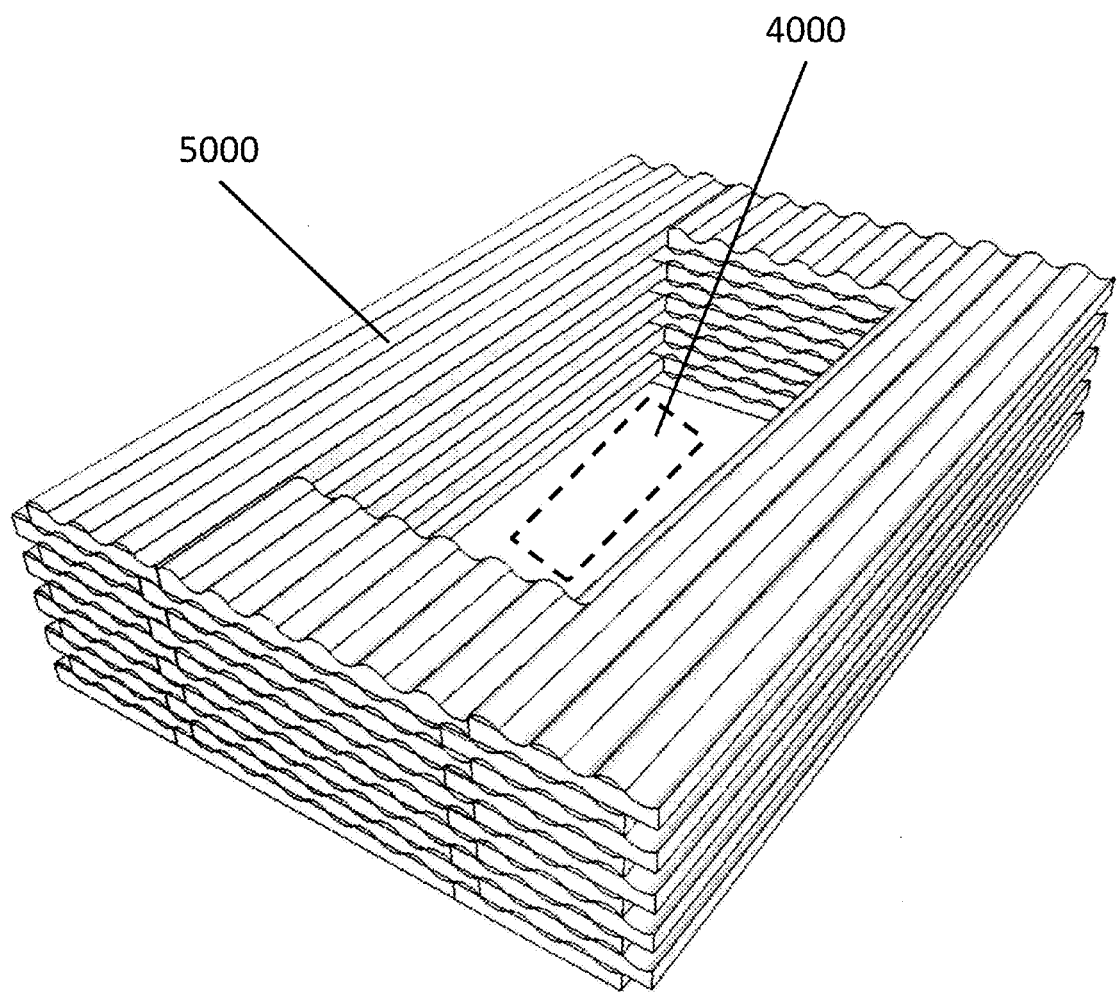
FIG. 15 illustrates another example of a portable shielding system for use with an multiple electron beam/electron beam sustained plasma discharge system.

FIG. 15 illustrates a portable water shielding housing 5000, which can be constructed to surround an electron beam generation unit 4000 so as to shield the environment from stray radiation.

The housing may be constructed of bladders or pillows that can be filled on site with water to provide the shielding. The bladders and pillows are designed to interlock together so that when stack, the water-filled bladders or pillows create a stable wall.

By utilizing bladders and/or pillows which can be filled with water, the empty bladders and/or pillows can be centrally stored and easily transported to a contamination site for construction. Moreover, by being water filled, heavy construction equipment is not required in constructing the shield because the empty bladders and/or pillows can be placed into their positions before filling.

With respect to converting lower molecular weight gaseous hydrocarbon mixtures into higher molecular weight highly-branched hydrocarbons, conventionally, methane, the main component of dry natural gas, is first converted to syngas mixture of CO+H$_2$ via steam reforming endothermic reaction:

$$CH_4+H_2O \rightarrow CO+3H_2; \Delta H=+49.2 \text{ kcal/mol}$$

Syngas is a feedstock for many chemical processes, including production of methanol and Fischer Tropsch (FT) synthesis. For these two processes, the desired syngas ratio is H$_2$/CO=2, which is the stoichiometry of the direct oxidation exothermic reaction:

$$CH_4+0.5O_2 \rightarrow CO+2H_2; \Delta H=-8.5 \text{ kcal/mol}$$

Besides the more desirable H$_2$/CO ratio, direct oxidation reaction is much faster than steam reforming reaction with superficial contact times of about 10 ms and 1 sec, in the respective reactions.

Conventionally, the industry focused on oxygen-driven conversion of methane such as direct oxidation of methane or indirect oxidation of methane such as in FT synthesis, while non-oxidative methane conversion received less attention.

Direct oxidation conversion of methane typically involves partial oxidation to methanol or conversion to C$_2$+ hydrocarbons, primarily ethane C$_2$H$_6$ or ethylene C$_2$H$_4$ via oxidative coupling process. The operating parameters for these two conversions are different: oxidative coupling (OC) is normally carried out at lower total pressure P=0.1 to 0.5 MPa and elevated temperatures T>700° C., while direct partial oxidation (DPO) is typically performed at much higher pressure P=5 to 8 MPa and lower temperatures T<475° C. At mixed conditions at total pressure P=6.2 MPa and moderate temperature T=550-600° C., increasing oxygen partial pressure and temperature favors C$_2$+ pathway while reducing both parameters favors methanol. The main drawback of direct oxidation is its low selectivity towards C$_2$+ due to the competing reactions of carbon atoms with oxygen resulting in CO and CO$_2$.

Non-catalytic non-oxidative conversion of methane at high gas temperatures T>900° C. results in low selectivity towards C$_2$+ formation due to extensive generation of solid black carbon and molecular hydrogen. One step catalytic conversion of methane to higher molecular weight hydrocarbons in non-oxidative H$_2$/He carrier gas has been achieved using Pt—Co/NaY bimetallic catalyst at lower temperature T=250° C. This "one-step" process is primarily assigned to the metallic cobalt particles whose reduction is facilitated by the presence of platinum.

A high selectivity one-step conversion of methane to C2+ hydrocarbons in oxygen-free environment and to methanol at oxidative conditions has been demonstrated using partially-ionized non-equilibrium plasma at atmospheric pressure and ambient temperatures generated in methane using non-thermal plasma discharges such as dielectric barrier discharge (DBD) and pulsed corona discharge.

Furthermore, availability of high energy gamma, beta (electrons), or alpha particle radiation sources present another approach for conversion of low molecular weight hydrocarbons to higher molecular weight hydrocarbons.

For example, methane radiolysis by alpha particles emanated from radon gas results in reduced total gas pressure, formation of hydrogen, ethane, propane, butane, and pentane and a small amount of higher liquid hydrocarbons.

Methane irradiated by electrons shows qualitatively similar results to irradiation by the nuclear radiation with the formation of hydrogen, ethane, and higher molecular weight hydrocarbons, with a very slight change in total gas pressure. The primary products (positive ions and free radicals) resulting from reactions induced in methane by 100 eV electrons are produced in nearly equal amounts, 45% and 55%, respectively.

A gas to liquid fuels conversion of hydrocarbon gas mixtures in oxygen free environment is driven by free radicals and molecular ions generated in the gas mixtures either by electron beam alone or by electron-beam combined with non-thermal plasma discharge, such as pulsed dielectric barrier discharges, corona discharges, glow discharges, gliding arc discharges, etc.

Such electron beam or electron-beam combined with non-thermal plasma discharge driven conversions of gaseous feedstock are further enhanced by hydrocarbon branching initiating substances; such as admixtures with light alkynes such as acetylene (C$_2$H$_2$), methyl acetylene (C$_3$H$_4$), dimethyl acetylene (C$_4$H$_6$), propane, and light alkenes such as ethylene (C$_2$H$_4$), propene (C$_3$H$_6$), butane (C$_4$H$_8$), etc.

In another embodiment, the hydrocarbon gas is comprised of natural gas enriched with higher molecular weight hydrocarbons such as straight run gasoline, naphta, bitumen, etc. derived from distillation of crude oil.

In a further embodiment, the gas to liquid fuels conversion feed stock may contain hydrogen sulfide (H$_2$S).

In an electron beam conversion of gaseous feedstock driven or an electron-beam combined with non-thermal plasma discharge driven conversion of gaseous feedstock carried out at above atmospheric pressures and relatively low gas temperatures (T<300° C.), alkylation of light olefin additives; such as addition of methyl and higher alkyl radicals to ethylene, acetylene, or propene; takes place concurrently with dissociation and ionization of ethylene (C$_2$H$_6$) or acetylene (C$_2$H$_4$) with later leading to formation of the highly reactive acetylene ions (C$_2$H$_4$)$^+$ and highly reactive methyl dyne (CH), as well as CH$_2$ and C$_2$H radicals.

The CH radical readily reacts with other unsaturated hydrocarbons; such as acetylene, ethylene (C$_2$H$_4$, alkene (C$_3$H$_4$, CH$_2$CCH$_2$), propane (C$_3$H$_4$, CH$_3$CCH), and propene (C$_3$H$_6$); resulting in active branching or isomerization In all of these cases, the dominant product channels are characterized by loss of an H-atom, following CH addition, forming a general pattern for the reaction of CH with small unsaturated hydrocarbons:

$$CH+C_nH_m \rightarrow C_{n+1}H_m+H$$

In case of the CH+C$_3$H$_6$ reaction, 1,3-butadiene isomer of C4H6 is the major product, and non-negligible quantities of 1,2-butadiene and 1-butyne are also formed.

The presence of hydrogen sulfide (H$_2$S) in the feedstock gas may also affect rates of electron beam conversion of gaseous feedstock driven or electron-beam combined with non-thermal plasma discharge driven conversion of gaseous feedstock and influence selectivity of the hydrocarbon conversion More specifically, the presence of hydrogen sulfide (H$_2$S) in the feedstock gas may change the rate and selectivity during the pyrolysis of ethane, propane, methyl propane, butane, dimethyl propane, decane, I-dodecane, butyl benzene, tetralin, hexadecane, with hydrogen sulfide acting as a catalyst, replacing the slow rate of hydrogen transfer by more rapid reactions.

Other embodiments of an electron beam conversion of gaseous feedstock driven or an electron-beam combined with non-thermal plasma discharge driven conversion of gaseous feedstock may include natural gas blended with various pyrolysis gases obtained from pyrolysis of coal, biomass, municipal waste, etc.

The disclosed electron beam sustained non-thermal plasma discharge allows for a steady sustainable non-thermal plasma environment at atmospheric and above atmospheric gas pressures, thereby enabling industrial scale electron-beam driven gas to liquid fuel conversion.

Electron beam sustained non-thermal plasma discharges allow conversion of high-pressure gas mixtures without special additives with low ionization potential In one embodiment, a high power e-beam is combined with a high voltage dielectric-barrier discharge. The dielectric-barrier discharges are characterized by the presence of insulating layers between metal electrodes surrounding the discharge space, in addition to insulating the metal electrodes such that the dielectric barrier provides an insulation of the manifold of gas to liquid fuel reactor from chemically active gas under electron beam or electron-beam combined with non-thermal plasma discharge radiolysis.

In a further embodiment, metal electrodes can be imbedded inside the insulating dielectric layers. Moreover, different planar or cylindrical configurations may be deployed.

The presence of the dielectric(s) precludes dc operation, thus a typical operating range for dielectric-barrier discharge is 0.5 kHz to 500 kHz.

For self-sustained atmospheric pressure discharge and voltage at 10 kV, gap spacing is limited to less than 1 cm. However, when the higher voltage 10 kV to 100 kV discharge is initiated at and sustained by intense electron beam, the gap space may be increased significantly.

An e-beam-sustained non-thermal plasma discharge conversion process optimizes the energy deposited into the gas by the non-thermal plasma discharge system versus the energy deposited by the electron beam, as e-beam accelerators are generally more expensive per kW power than plasma discharge generators. Such optimization also takes into account very high 90-95% wall plug efficiency of modern low-to-medium electron energy 0.5 MeV to 2.5 MeV electron accelerators versus only 50-55% wall plug efficiency of some 10 kV to 100 kV non-thermal plasma discharge devices.

Non-thermal plasma discharges driven by e-beam also maintains good space localization and homogeneity of the ionized gas (plasma) that serves as an efficient catalyst to chemical reactions leading to polymerization of lower molecular weight $C_2$-$C_4$ gaseous alkanes of natural gas (methane, ethane, propane and butane) into highly branched higher molecular weight gasoline range alkanes ($C_5$-$C_{12}$) that are liquefiable at room temperatures (T<36° C.).

The e-beam/discharge processing of natural gas enriched with volatile higher molecular weight components obtained from crude oil via e-beam/discharge induced cracking process may also be used to convert primarily linear or slightly branched hydrocarbons into highly-branched ones with higher octane value.

It is noted that the e-beam-sustained non-thermal plasma discharge conversion process may utilize multiple horizontal e-beams positioned on both sides of a pressurized natural gas "pipeline."

The e-beam-sustained non-thermal plasma discharge conversion process may also process feedstock gas under hydrogen depleted conditions achieved by prompt removal of hydrogen formed in the process of radiolysis of the feedstock gas without replenishing feedstock gas pressure until the point of condensation of highly branched gasoline range fuel.

The e-beam-sustained non-thermal plasma discharge conversion process may further feedstock gas under hydrogen depleted conditions achieved by prompt removal of hydrogen formed in the process of radiolysis of the feedstock gas while replenishing feedstock gas pressure with higher molecular weight petroleum distillation product in products; such as straight-run gasoline, naphta, and bitumen heated above their boiling points.

Figure 17:
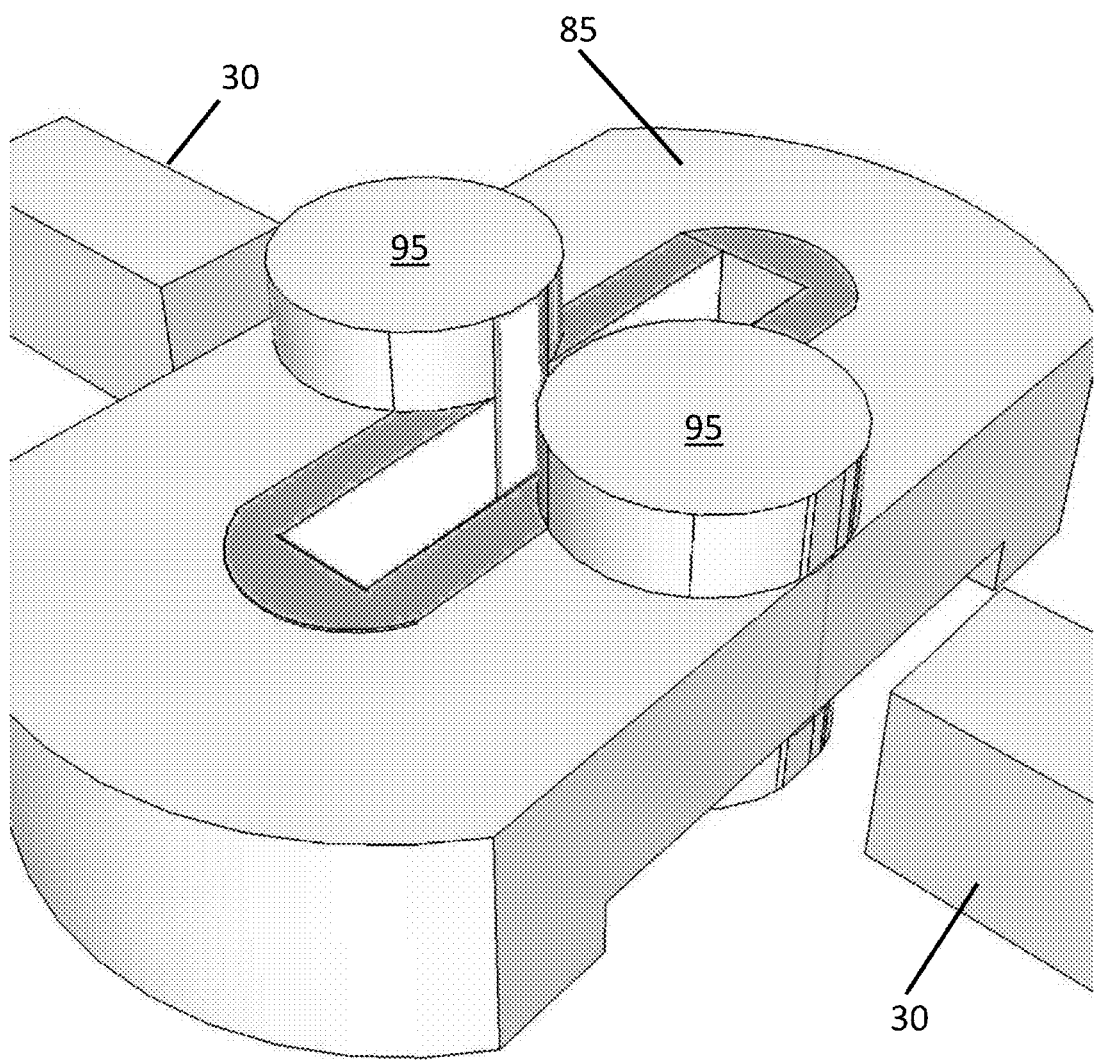
FIG. 17 illustrates a donut shaped biomass processing system.

As illustrated in FIG. 17, the above described processes and systems can be implemented to convert biomass to liquid fuel.

In the illustrated example, E-beam-induced fast pyrolysis of a biomass/natural gas mixture takes place at moderate temperatures between 400-450°.

The system of FIG. 17 includes a donut shaped biomass processing tank 85. The biomass processing tank 85 includes windows to allow irradiation by the electron beam generation units 30. The chamber 85 may also include cavitators (not shown) that cavitate the mixture between windows.

Dry small particulates of biomass are cyclone-whirled inside vaporization tanks 95 under a penetrating e-beam in the atmosphere of natural gas flowing through the biomass processing tank 85.

The use of natural gas as a carrier gas provides a stable and diversified liquid fuel mixture by adding cross-linking and branching to both straight chain and cyclic hydrocarbons Biomass, such as algae or wood, should be dried and ground down to very small particulates to increase the overall surface area. This allows for fast vaporization and mixing with the carrier gas (natural gas) for better e-beam penetration of the mixture volume inside the biomass processing tank 85 at moderate electron energies of 1.5 MeV or less.

In the system of FIG. 17, the process involves a fast conversion of biomass into liquid bio-fuel in atmosphere of natural gas, absence of oxygen. In addition to fast heating and vaporization of biomass, the process also involves generation of molecular ions and excited free radicals and molecular polymerization taking place both in solid and vapor phases.

The vaporization tanks 95 are separated from the flow of the circulating mixture of biomass vapors and carrier natural gas by membranes that retain solid charred or charcoal particulates inside the biomass vaporization tanks 95. The mixture goes through a condenser (not shown) where the liquid fuel is collected while non-condensable gases such as H2 and CO2, etc. are separated from the natural gas/methane flow before going through the next biomass vaporization tanks 95 on the opposite side of the donut shaped biomass processing tank 85.

It is noted that the above described processes and systems can be implemented to convert natural gas to a liquid fuel. In this application, the electron beam non-thermal plasma conversion is used to convert feed gas into highly branched liquid alkanes inside a circulation loop.

In this process, the feed gas may include dry Natural Gas, and wet Natural Gas or an associated petroleum gas. The feed gas may also be mixed with an energy transfer enhancing gaseous additive, such as argon, and/or a branching process enhancing gaseous additive, such as ethylene.

The feed gas is irradiated using the electron beam non-thermal plasma conversion system/process to produce liquid products.

The process may include separation of the produced liquid product, comprising a mix of highly-branched alkanes, into individual components using a distillation column followed by further purification/condensation or condensation/purification depending on the substance and the methods of final purification.

It is further that the above described processes and systems can be implemented to crack a liquid hydrocarbon composition resulting in the conversion of certain products of conventional oil distillation; e.g., naphtha and others; into highly branched alkanes.

In this situation, naphtha is heated by electron beam irradiation to the point of vaporization followed up an electron beam non-thermal plasma conversion of the obtained vapors, with natural gas and other enhancing gaseous additives, into highly branched liquid alkanes.

In addition, the above described processes and systems can be implemented to clean-up of industrial flue gases. The industrial flue gases are irradiated using the electron beam non-thermal plasma conversion system/process to produce liquid products. It is noted that industrial flue gases may be mixed with Natural Gas, wet Natural Gas or an associated petroleum gas, an energy transfer enhancing gaseous additive, such as argon, and/or a branching process enhancing gaseous additive, such as ethylene.

The process may include separation of the produced liquid product, comprising a mix of highly-branched alkanes, into individual components using a distillation column followed by further purification/condensation or condensation/purification depending on the substance and the methods of final purification.

The electron beam non-thermal plasma conversion system/process results in a mixture of high-octane (>100) highly-branched alkanes (saturated hydrocarbons) with carbon chains $C_6$-$C_{12}$ that are liquid at room temperature and are highly valuable compared to straight-run gasoline obtained by the fractional distillation of petroleum that mostly consists of non-aromatic (aliphatic) linear hydrocarbons and common gasoline additives such as aliphatic highly-branched isooctane $C_8H_{18}$ that is assigned an octane number of 100 and aromatics such as benzene and methylbenzene (toluene) that have an octane number of 101 and 103-106 respectively, while linear n-heptane is the zero point of the octane rating scale.

In the refining process, the crude oil is converted into transportation fuels; such as gasoline, jet fuel, and diesel fuel; and other petroleum products, such as liquefied petroleum gas (LPG), heating fuel, lubricating oil, wax, and asphalt.

In the course of fractional distillation, crude oil is separated into fractions according to different boiling points of hydrocarbons of varying chain lengths. This fractional distillation process yields approximately 25% of straight-run gasoline from each barrel of crude oil.

Oil refinery products include jet fuel, diesel fuel and other petroleum products, such as liquefied petroleum gas (LPG), heating fuel, lubricating oil, wax, and asphalt.

Straight-run gasoline is a complex mixture of over 500 hydrocarbons that may have between 5 to 12 carbons. Smaller amounts of alkane cyclic and aromatic compounds are present. Virtually no alkenes or alkynes are present in gasoline.

Methylbenzene formed together with benzene and dimethyl benzenes (xylenes) during the catalytic reforming of $C_6$-$C_9$ naphthas accounts for 90% of the methylbenzene (toluene) produced. Most of this methylbenzene (~80%) is not separated, but is immediately mixed with petrol to increase its octane number.

It is noted that xylenes present in the mixture have octane number of 115-117.

As the consumption of lead-free gasoline increases, so does the demand for the octane number upgrading additives.

It is noted that $C_1$-$C_4$ alkanes are in gaseous form; from $C_5$-$C_{17}$, the alkanes are liquids; and after $C_{18}$, the alkanes are solids under standard temperature and pressure conditions.

As the boiling point of alkanes is primarily determined by the length of the carbon chain, the boiling temperatures increase with increase of the molecular weight, rising about 20-30° C. for each extra carbon atom added to the chain.

At a given amount of carbon atoms, a linear alkane will have a higher boiling point than its branched-chain isomers due to the greater contact surface area, thus the greater van der Waals forces, between the adjacent molecules in the liquid phase.

For example, compare n-butane with isobutane (2-methylpropane) which boil, respectively, at T=0° C. and T=−12° C. In case of two branched hexane isomers 2,3-dimethylbutane (($C_6H_{14}$) and 2,2-dimethylbutane ($C_6H_{14}$) that boil, respectively, at T=58° C. and T=50° C., two molecules of 2,3-dimethylbutane have greater intermolecular van der Waals forces due to better ability to form an interlocking surface contact with each other compared to the cross-shaped 2,2-dimethylbutane molecules.

In case of branched isomers of octanes, isooctane has the lowest boiling temperature of T=99° C., while the most compact and most heavily branched of 24 octane isomers tetramethyl butane has the boiling point of T=106° C.

In contrast, the product of the electron beam non-thermal plasma conversion system/process is predominantly saturated $C_6$-$C_{12}$ hydrocarbons. The unsaturated hydrocarbons are formed only in the secondary processes of decomposition of the saturated hydrocarbons in the liquid droplets.

In one embodiment, the electron beam non-thermal plasma conversion process can be carried out under 1 MeV/50 mA electron beam at feed gas pressure P=1.5 atm, gas inlet T=30° C. The feedstock gas compositions are shown in Table 1.

TABLE 1

| GAS FEEDSTOCK COMPOSITION* | | | |
|---|---|---|---|
| Feedstock Components | Mixture I (NG) | Mixture II (HD5) | Mixture III |
| Methane ($CH_4$) | 92.3 | 1.5 | 63.3 |
| Ethane ($C_2H_6$) | 3.6 | 2.0 | 8.4 |
| Propane ($C_3H_8$) | 0.8 | 91.0 | 9.2 |
| Propene ($C_3H_6$) | 0.0 | 3.0 | 0 |
| Butane ($C_4H_{10}$) | 0.3 | 1.5 | 6.8 |
| Isobutane ($C_4H_{10}$) | 0.2 | 0.8 | 4.6 |
| Pentane | 0.0 | 0.0 | 2.8 |
| Isopentane | 0.0 | 0.0 | 2.6 |
| Nitrogen | 1.8 | 0.1 | 1.5 |
| Carbon Dioxide | 1.0 | 0.1 | 0.8 |

*Mixture I represents average natural gas composition in the US, mixture II represents composition of commercial propane gas (HD5) in the US, mixture III represents flare gas or associated petroleum gas (APG) though APG composition particularly as it relates to methane/carbon dioxide ratio may vary significantly from source to source.

The fractional composition of electron beam non-thermal plasma conversion system/process liquid product is shown in Table 2.

TABLE 2

| FRACTIONAL COMPOSITION OF AN ELECTRON BEAM NON-THERMAL PLASMA CONVERSION PROCESS PRODUCT | | |
|---|---|---|
| Distilled Fractions | Fractionation T [° C.] (Feed Gas Mixture I*) | Fractionation T [° C.] (Feed Gas Mixture II*) |
| Initial boiling point T [° C.] | 36.1 | 36.1 |
| 10 wt % | 65-69 | 66-71 |
| 20 wt % | 70-79 | 72-84 |
| 30 wt % | 80-91 | 85-95 |
| 40 wt % | 92-99 | 96-104 |
| 50 wt % | 100-114 | 105-116 |

TABLE 2-continued

FRACTIONAL COMPOSITION OF AN ELECTRON BEAM NON-
THERMAL PLASMA CONVERSION PROCESS PRODUCT

| Distilled Fractions | Fractionation T [° C.] (Feed Gas Mixture I*) | Fractionation T [° C.] (Feed Gas Mixture II*) |
|---|---|---|
| 60 wt % | 115-127 | 117-134 |
| 70 wt % | 128-140 | 135-149 |
| 80 wt % | 141-169 | 150-174 |
| 90 wt % | 170 | 175-184 |
| Terminal boiling point T[° C.] | 171-200 | 185-225 |
| Heavy Wax (wt %) | <2 | <3.0 |

The exposure of pressurized feed gas to intense electron beam alone or in combination with non-thermal plasma discharge results primarily in the formation of the alkyl radicals with the unpaired electron localized in the internal tertiary 3° C. or secondary 2° or C atoms as its localization on an external primary secondary 1° C. atom is much less likely.

In fact the 3°-H are inherently more reactive than 2°-H, and 2°-H are inherently more reactive compared to 1°-H by factors of 9:3:1 respectively. This corresponds with alkyl radical stability: tertiary radical species are more stable than secondary radical species, and secondary radical species are more stable than primary radical species.

One of the leading reactions between two alkyl radicals is disproportionation when instead of coupling they exchange a proton having one alkane and one alkene as the end products with the bond order increase by one over the reactants. The reaction is exothermic ($\Delta H=50$-95 kcal/mol=13-25 MJ/kg) and proceeds quite rapidly:

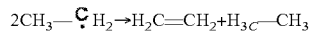

Alkene and Alkane Formation

When two different alkyl radicals disproportionate one acts as hydrogen donor while the other acts as hydrogen acceptor:

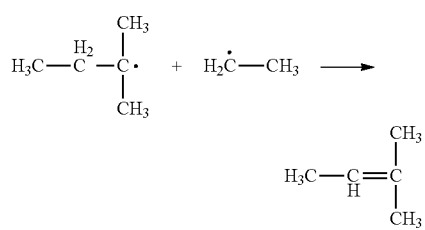

The efficient antiknock stability of the electron beam non-thermal plasma conversion system/process liquid product depends on the initial composition of feed gas. Lower octane values of final liquid product are typical for the feed gas mixtures enriched in propane, n-butane, or n-pentane.

For example, the prevalence of propane in the feed gas leads to increased content of 2-methylpentane and 3-methylpentane that have relatively low octane values of 73 and 75 respectively. Recombination products of n-butyl and n-amyl radicals also have low octane values 3,4-dimethylhexane, 85; 3,4-diethylhexane, 62; 3-methyl-4-ethylhexane, 68; 3,4-dimethylheptane, 56 and etc. The presence of such hydrocarbons lowers the efficient antiknock stability of synthesized liquids.

Some of some hydrocarbon components of the electron beam non-thermal plasma conversion system/process product mixture and its dependence on the feed gas are shown in Table 3.

TABLE 3

ELECTRON BEAM NON-THERMAL PLASMA CONVERSION
SYSTEM/PROCESS LIQUID PRODUCT AND SOME OF ITS
INDIVIDUAL COMPONENTS

| LIQUID PRODUCT MIXTURE [Condenser T = −42° C.] | Boiling $T_B$ [° C.] | Density Liquid [g/ml] at 25° C. | Feed Gas Mixture I [wt %] | Feed Gas Mixture II [wt %] |
|---|---|---|---|---|
| PENTANES ($C_5H_{12}$) | 36.1 | | | |
| HEXANES ($C_6H_{14}$) | | | | |
| 2,2-Dimethylbutane | 50 | 0.649 | 0.05 | 0.14 |
| 2,3-Dimethylbutane | 58 | 0.662 | 0.42 | 0.28 |
| 2-Methylpentane | 62 | 0.660 | 0.38 | 0.28 |
| 3-Methypentane | 64 | 0.660 | 0.13 | 0.28 |
| n-Hexane | 69 | 0.655 | 0.02 | 0.02 |
| Total Hexanes: | | | 1.0 | 1.0 |
| HEPTANES ($C_7H_{16}$) | | | | |
| 2,2-Dimethylpentane | 78 | 0.674 | 0.05 | 0.11 |
| 2,4-Dimethylpentane | 80 | 0.673 | 0.01 | 0.01 |
| 2,2,3-Trimethylbutane | 80.9 | 0.690 | 0.60 | 0.40 |
| 3,3-Dimethylpentane | 86 | 0.693 | 0.11 | 0.04 |
| 2,3-Dimethylpentane | 90 | 0.695 | 0.11 | 0.33 |
| 2-Methylhexane | 91 | 0.679 | 0.02 | 0.02 |
| 3-Methylhexane | 92 | 0.678 | 0.01 | 0.08 |
| 3-Ethylpentane | 93.5 | 0.684 | 0.09 | 0.01 |
| n-Heptane | 98 | | 0.0 | 0.0 |
| Total Heptanes: | | | 1.0 | 1.0 |
| OCTANES* ($C_8H_{18}$) | | | | |
| 2,2,4-Trimethylpentane | 99 | | | |
| 2,2-Dimethylhexane | 105.6 | | | |
| 2,2,3,3-Tetramethylbutane | 106 | | | |
| 2,5-Dimethylhexane | 108 | | | |
| 2,2,3-Trimethylpentane | 110 | | | |
| 2,3,3-Trimethylpentane | 115 | | | |
| 2,3-Dimethylhexane | 116 | | | |
| 2-Methylheptane | 117 | | | |
| 3-Methylheptane | 120 | | | |
| n-Octane | 126 | | | |
| NONANES* ($C_9H_{20}$) | | | | |
| 2,2,4-Trimethyhexane | 125.5 | | | |
| 2,2-Dimethylheptane | 132 | | | |
| 2,2,3-Trimethylhexane | 133.7 | | | |
| 2,3,3-Trimethylhexane | 137.9 | | | |
| 2,3-Dimethylheptane | 140.8 | | | |
| 3-Ethylheptane | 143 | | | |
| n-Nonane | 151 | | | |
| DECANES* ($C_{10}H_{22}$) | | | | |
| 2,2,3,3-Tetramethylhexane | 161.3 | | | |
| 2,3,4-Trimethylheptane | 161.7 | | | |
| 2-Methyl-3-Ethylheptane | 161.9 | | | |
| 2,2,3,4-Tetramethylhexane | 162.2 | | | |
| n-Decane* | 174 | | | |
| UNDECANES* ($C_{11}H_{24}$) | | | | |
| 2,6-Dimethyloctane | 159.7 | | | |
| 3,5-Dimethyloctane | 160 | | | |
| 2,2-Dimethyloctane | 164 | | | |
| 2,3-Dimethyloctane | 164.5 | | | |
| n-Undecane | 196 | | | |
| DODECANES* ($C_{12}H_{26}$) | | | | |
| 2,2-Dimethyldecane | 201 | | | |
| 2,2,3-Trimethylnonane | 202 | | | |

TABLE 3-continued

ELECTRON BEAM NON-THERMAL PLASMA CONVERSION SYSTEM/PROCESS LIQUID PRODUCT AND SOME OF ITS INDIVIDUAL COMPONENTS

| LIQUID PRODUCT MIXTURE [Condenser T = −42° C.] | Boiling $T_B$ [° C.] | Density Liquid [g/ml] at 25° C. | Feed Gas Mixture I [wt %] | Feed Gas Mixture II [wt %] |
|---|---|---|---|---|
| 2,2,3-Pentamethylheptane | 212 | | | |
| n-Dodecane | 216.2 | | | |

*$C_8$, $C_9$, $C_{10}$ $C_{11}$ & $C_{12}$ alkanes have 24, 35, 75, 159 & 355 isomers respectively.

The most volatile component of the electron beam non-thermal plasma conversion system/process liquid product is n-pentane ($C_5H_{12}$) with highest boiling point out of its three isomers T=36.1° C. that corresponds to initial boiling point of the electron beam non-thermal plasma conversion system/process mixture.

The product of electron beam non-thermal plasma conversion system/process, a liquid mixture of high-octane highly-branched alkanes with octane numbers of individual components ranging from of 95-105 can be immediately used as valuable octane number upgrading additive before its separation into individual components similar to toluene containing mixtures.

Alternatively, individual components in the electron beam non-thermal plasma conversion system/process product mixture can be separated, purified, and offered in the market for various industrial uses as well as valuable research chemicals. The electron beam non-thermal plasma conversion system/process produced liquid mixture primarily consists of highly-branched isomeric alkanes with very small amount of linear alkanes, not exceeding 3 wt %.

The efficient antiknock stability of the electron beam non-thermal plasma conversion system/process liquid product depends on the initial composition of the feed gas. Lower octane values of final liquid product are typical for the feed gas mixtures enriched in propane, n-butane, or n-pentane.

For example the prevalence of propane in the feed gas leads to increased content of 2-methylpentane and 3-methylpentane that have relatively low octane values of 73 and 75 respectively. Recombination products of n-butyl and n-amyl radicals also have low octane values 3,4-dimethylhexane, 85; 3,4-diethylhexane, 62; 3-methyl-4-ethylhexane, 68; 3,4-dimethylheptane, 56 and etc. The presence of such hydrocarbons lowers the efficient antiknock stability of synthesized liquids.

The feed gas mixtures with higher content of methane, ethane, isobutene, and neopentane lead to the high octane liquid product containing main components such as 2,2,3,3-Tetramethylbutane, 2,2,3-Trimethylpentane, 2,2,3-Trimethylbutane and 2,3,3-Trymethylpentane with octane values of 103, 102, 101, and 100 respectively. The methyl and ethyl radicals, being the products of irradiation of methane and ethane, do not give branched molecules by recombination with each other. However, these small radicals are capable of generating strongly branched molecules due to combinations with large alkyl radical, radical exchange or joining to alkenes.

The following fractions hexanes ($C_6H_{14}$), heptanes ($C_7H_{14}$), octanes ($C_8H_{18}$) and nonanes ($C_9H_{20}$) are distilled or boiled off at T=50-69° C., T=78-94° C., T=99-126° C., and T=128-151° C. respectively. The terminal boiling point of decane isomers ($C_{10}H_{22}$) is T=174° C.

The distillation of undecanes ($C_{11}H_{24}$) is completed at T=196° C. that is the terminal boiling point temperature indicating the presence of undecanes in the liquid product. The terminal distillation point of dodecanes is T=216° C. (see Table 4).

TABLE 4

MELTING & BOILING POINTS OF $C_1$-$C_{12}$ ALKANES

| Name | Molecular Formula | Melting Point (° C.) | Boiling Point (° C.) |
|---|---|---|---|
| methane | $CH_4$ | −183 | −164 |
| ethane | $C_2H_6$ | −183 | −89 |
| propane | $C_3H_8$ | −190 | −42 |
| butane | $C_4H_{10}$ | −138 | −0.5 |
| pentane | $C_5H_{12}$ | −130 | 36 |
| hexane | $C_6H_{14}$ | −95 | 69 |
| heptane | $C_7H_{16}$ | −91 | 98 |
| octane | $C_8H_{18}$ | −57 | 125 |
| nonane | $C_9H_{20}$ | −51 | 151 |
| decane | $C_{10}H_{22}$ | −30 | 174 |
| undecane | $C_{11}H_{24}$ | −25 | 196 |
| dodecane | $C_{12}H_{26}$ | −10 | 216 |

The $C_{12}H_{26}$ and $C_{13}H_{22}$ fractions have higher boiling temperatures of 216° C. and 235° C. respectively. The total content of the heavy alkanes, so-called still bottoms, in the synthesized liquid mixture does not exceed 2-3 wt % (see Table 2 above).

The measured fractional composition of the synthesized liquid is fairly close to the typical compositions of commercial gasoline mixtures.

It is noted that natural gas consists of hydrocarbons that remain in the gaseous phase at temperature T=288.15 K (15.15° C., 59.27° F.;) and atmospheric pressure P=101.325 kPa (1 atm; 14.696 psi), considered to be international standard temperature and pressure (ISTP) conditions for natural gas and similar fluids [Natural gas-Standard Reference Conditions (ISO 13443): International Organization for Standardization. 1996, Geneva, Switzerland.]

This effectively limits the definition of natural gas to four hydrocarbon components: methane ($C_1H_4$), ethane ($C_2H_6$), propane ($C_3H_8$), and two butanes ($C_4H_{10}$): n-butane and iso-butane (2-methylpropane) as well as small percentage of atmospheric gases such as nitrogen ($N_2$) and carbon dioxide ($CO_2$)

Natural gas reservoirs may also contain heavier hydrocarbons often referred as natural gas condensates beginning from pentane ($C_5H_{12}$) that are liquid at standard temperature and pressure, but may exist in gaseous phase in the reservoir.

However, components heavier than hexadecane ($C_{16}H_{34}$) produced as liquid or solid waxy compounds are not considered as part of natural gas condensate.

Average natural gas composition in the US, according to Gas Technology Institute 1989-1992 survey data containing 7000 natural gas samples, is as follows: 92.3% methane ($CH_4$), 3.6% ethane ($C_2H_6$), 0.8% propane ($C_3H_8$), 0.5% butane ($C_4H_{10}$), 1.8% nitrogen ($N_2$) and 1% carbon dioxide ($CO_2$).

Natural gas with the listed above average composition has mass density d=0.74 kg/m3 (molar mass=17.48 kg/kmol) at STP conditions. Natural gas compressibility factor Z changes with pressure from Z=0.9978 at P=0.1 MPa (1 atm) to 0.8916 at P=5 MPa (50 atm) at constant temperature T=15.15° C. Natural gas mass density variation with increase of pressure is shown in Table 5 at two temperatures T=15.15° C. and T=75.75° C.

TABLE 5

NATURAL GAS DENSITY AT VARIOUS PRESSURES AND TEMPERATURES

| | P [MPa]/T [° C.] | | | | | | | |
|---|---|---|---|---|---|---|---|---|
| | 0.1/15 | 01/75 | 0.5/15 | 0.5/75 | 1.0/15 | 1.0/75 | 5.0/15 | 5.0/75 |
| d [kg/m$^3$] | 0.74 | 0.60 | 3.69 | 3.03 | 7.46 | 6.09 | 40.89 | 31.67 |

The electron beam non-thermal plasma conversion system/process provides for an efficient process of converting natural gas to high octane (100+) gasoline-like fuel additive.

For example, the electron beam non-thermal plasma conversion system/process input is natural gas (NG) with a lower heating value (LHV) of 46 MJ/kg and energy expenditures per unit of liquid fuel (LF) product: electron beam energy of 15 MJ/kg→OUTPUT is 86 wt % Liquid Fuel (LF with LHV=46 MJ/kg) plus 11 wt % hydrogen gas (H2 with LHV=120 MJ/kg) and 3 wt % of heavy wax (HWX) with LHV=46 MJ/kg.

The mass balance is NG [1 MMcf=20 MT]→LF [17.2 MT=150 BBL]+H2[2.2 MT]+HWX[0.6 MT].

The energy balance is NG [20 MT×46 GJ/MT=940 GJ]+ EE [15-/MT×17.2 MT=258 GJ]→LF [45 GJ/MT×17.2 MT=774 GJ]+H2 [120 GJ/MT×2.2 MT=264 GJ]+HWX [0.6 MT×45 GJ/MT=27 GJ]+Q [133 GJ heat losses].

The electron beam non-thermal plasma conversion system/process may also generate hydrogen gas.

The electron beam non-thermal plasma conversion system/process is also applicable to conversion of biomass to liquid. In the biomass to liquid process, bio-oils are generated by flash pyrolysis and hydrogenation and cracking of bio-oils occur simultaneously.

The electron beam non-thermal plasma conversion system/process can be utilized on site where the source of natural gas and/or biomass is available saving on transportation costs. Electricity can be generated by turbine fueled by natural gas.

An integrated bio/fossil-fuel refinery & gas to liquid system driven by ionization energy source utilizes powerful high-energy electron beam combined with non-thermal plasma discharge to convert a large variety of feed stocks ranging from natural gas to lignocellulosic biomass to lower grade oil refinery products to coal and shale particulates and combination thereof to a range of output products such as liquid fuels from gasoline to jet fuel to diesel range, hydrocarbon specialty chemicals, hydrogen gas and hydrogen enriched natural gas (HENG)

The entire system may be powered by electricity supplied by the grid or stand-alone generators including gas turbines powered by natural gas or town gas or hydrogen-enriched natural gas produced on the site.

The main component of the disclosed liquid fuel producing system is high power high wall-plug efficiency electron beam accelerator providing scanned over the e-beam at the electron energy range between E=0.5-5 MeV, preferably between E=0.5-2.5 MeV and most preferably between E=0.5-2.5 MeV and electron current between 10 mA-1000 mA, preferably between 100 mA-1000 mA.

The e-beam output/input window of the accelerator is tightly integrated into the walls of the conversion reactors, both solid to vapor and natural gas/vapor to liquid fuel conversion reactors with the e-beam output/input windows positioned either along the flow of the medium or across the flow of the medium that is irradiated by high energy electrons inside the reactors.

The e-beam energy, the size of the e-beam output window, the working volume of the reactor(s) and the average specific gravity of the medium intended for the conversion and exposed to e-beam are chosen to assure the most effective deposition of the entire e-beam energy in such medium.

The accelerating tubes and insulation tanks of the electron accelerators may be also positioned ether horizontally or vertically in regards to the land notwithstanding the position of their respective e-beam output windows or the medium flow in the reactors.

The e-beam irradiated feedstock medium may comprise solid organic particulates alone placed inside a fixed-bed reactor, a packed-bed reactor, or a cone reactor, or solid organic particulates entrained in a carrier gas flow where carrier gas may be comprised of natural gas, methane extracted from gas hydrates, hydrogen enriched natural gas or methane or produced gas.

Alternatively, e-beam irradiated feedstock medium may be comprised of any hydrogen-rich carrier gas alone comprising natural gas, methane extracted from methane hydrates, hydrogen enriched natural gas or hydrogen enriched methane or produced gas.

The electron beam non-thermal plasma conversion system/process may be realized by a first module constituting two sub-modules: a "condensed matter to vapor" conversion reactor and a "char, gas and vapor separation" system.

The first sub-module, the "condensed matter to vapor" conversion reactor, may comprise a fixed-bed reactor, a fluidized bed reactor, a packed bed reactor, a cone reactor, or any other type of reactor typically used for fast pyrolysis of biomass modified to incorporate the e-beam output/input window(s).

The first sub-module may comprise a free fall/entrained flow reactor where solid particulates of dry biomass are entrained in the flow of carrier gas comprised of natural gas, associated petroleum gas, hydrogen enriched natural gas.

Optionally, feedstock of lignocellulosic biomass may be enriched with essentially sulfur-free bitumen or bitumen vapor bitumen and/or any other hydrogen-rich low value crude oil derivatives in solid, liquid or vapor phase.

The process by which essentially sulfur-free bitumen can be obtained from the bitumen naturally containing sulfur or even man-made sulfur-enriched bitumen can be described as follows: first the sulfur containing solid bitumen is melted by electron beam to form a mixture of liquid bitumen and liquid sulfur-enriched fluid, wherein the liquid bitumen has a lower specific gravity compared to liquid sulfur-enriched liquid, and therefore, the liquids can be easily separated one from another.

In the second sub-module, the "char, gas and vapor separation" system, high molecular weight organic vapors, generated from of the biomass feedstock via e-beam driven flash pyrolysis, are separated from the regular by-products of the pyrolysis including solid char particulates and the low molecular weight gases. The vapor separation system may include a cooling system to quench the reaction and condense the high molecular weight organic vapors, or it may also comprise a gas separation system.

The electron beam non-thermal plasma conversion system/process may include another module, constituting a "gaseous matter to liquid" conversion reactor, wherein gaseous matter, comprised of high molecular weight organic vapors such as biomass vapors, are mixed with hydrogen enriched natural gas or natural gas alone.

In summary, the electron beam non-thermal plasma conversion systems/processes described above can operate a versatile bio-fuel refinery system converting a broad range of feedstocks into drop-in fuels consisting of highly branched hydrocarbons. These may include jet fuel and diesel as well as certain valuable specialty chemicals.

The electron beam non-thermal plasma conversion systems/processes are driven entirely by electricity and can be characterized as a flash pyrolysis system with very low carbon footprint.

To achieve flash pyrolysis, an external volumetric heating source is used in the form of high power electron beam instead of a conventional approach that involves a contact surface heating in one form or another.

The electron beam non-thermal plasma accelerator provides a high power, self-scanning 1 MW/1.5 MEV electron beam.

The e-beam driven flash pyrolysis system may be modular and scalable, and easily tunable for efficient processing of a wide variety of feedstocks.

The electron beam non-thermal plasma approach provides a solution to biomass pyrolysis due to its rapid volumetric heating capacity of biomass particulates, and the high concentration of short-lived but extremely chemically active transient intermediaries generated in both solid and gaseous medium by the ionizing energy of the electron beam.

In the e-beam driven flash pyrolysis, the hydrogenation, as well as hydrocracking, is initiated early in the bio-oil vapor phase by ionizing e-beam radiation. Hydrogen for the process may be supplied via e-beam radiolysis of natural gas and/or low value oil refinery products such as heavy residue of bitumen added in the mix.

The presence of bitumen serves not only as a source of hydrogen for stabilization of bio-oils but also enhances compounds resulting from cross reactivity between transient intermediates of lignocellulosic feedstock and bitumen origin.

The presence of natural gas increases the generation of highly branched hydrocarbons of lower molecular weight closer to gasoline range, allowing additional output flexibility based on the input mix.

As noted above, the process begins with generation of bio-oil vapors via flash pyrolysis, with partial stabilization of bio-oil vapors taking place in the volume of the first reactor. This is followed by rapid quenching and separation of bio-oil products from lower molecular weight gaseous content and charred, further followed by continued hydrotreatment and hydrocracking of the bio-oil vapors via e-beam radiolysis Electron beam radiolysis of bio-oil vapors enriched with natural gas generates a massive amount of free radicals leading to the well-known phenomena of scission of long carbon chains as well as inducing branching of their shorter intermediates. The vapors are extricated to generate fuel.

A method for converting a gaseous hydrocarbon mixture into highly-branched liquefiable hydrocarbons may enrich natural gas with acetylene; irradiate acetylene enriched natural gas with an electron beam sustained non-thermal plasma discharge; cool irradiated gas mixture; and remove liquefied highly-branched hydrocarbons.

A method for converting long carbon chain fractions of crude oil into highly-branched liquefiable hydrocarbons may include cavitating long carbon chain fractions of crude oil with natural gas; irradiating cavitated long carbon chain fractions of crude oil with an electron beam sustained non-thermal plasma discharge to create short carbon chain fractions; enriching short carbon chain fractions with natural gas; irradiating natural gas enriched short carbon chain fractions with an electron beam sustained non-thermal plasma discharge; cooling irradiated gas mixture; and removing liquefied highly-branched hydrocarbons.

A method for converting long carbon chain fractions of crude oil into highly-branched liquefiable hydrocarbons may include cavitating long carbon chain fractions of crude oil with natural gas; irradiating cavitated long carbon chain fractions of crude oil with an electron beam to create short carbon chain fractions; enriching short carbon chain fractions with natural gas; irradiating natural gas enriched short carbon chain fractions with an electron beam; cooling irradiated gas mixture; and removing liquefied highly-branched hydrocarbons.

A method for converting long carbon chain fractions of crude oil into highly-branched liquefiable hydrocarbons may include cavitating long carbon chain fractions of crude oil with natural gas; irradiating cavitated long carbon chain fractions of crude oil with an electron beam to create short carbon chain fractions; enriching short carbon chain fractions with natural gas; irradiating natural gas enriched short carbon chain fractions with an electron beam sustained non-thermal plasma discharge; cooling irradiated gas mixture; and removing liquefied highly-branched hydrocarbons.

A method for converting long carbon chain fractions of crude oil into highly-branched liquefiable hydrocarbons may include cavitating long carbon chain fractions of crude oil with natural gas; irradiating cavitated long carbon chain fractions of crude oil with an electron beam sustained non-thermal plasma discharge to create short carbon chain fractions; enriching short carbon chain fractions with natural gas; irradiating natural gas enriched short carbon chain fractions with an electron beam; cooling irradiated gas mixture; and removing liquefied highly-branched hydrocarbons.

A method for converting long carbon chain fractions of crude oil into highly-branched liquefiable hydrocarbons, comprising cavitating long carbon chain fractions of crude oil with natural gas; irradiating cavitated long carbon chain fractions of crude oil with an electron beam sustained non-thermal plasma discharge to create short carbon chain fractions; enriching short carbon chain fractions with acetylene; irradiating acetylene enriched short carbon chain fractions with an electron beam sustained non-thermal plasma discharge; cooling irradiated gas mixture; and removing liquefied highly-branched hydrocarbons.

A method for converting long carbon chain fractions of crude oil into highly-branched liquefiable hydrocarbons may include cavitating long carbon chain fractions of crude oil with natural gas; irradiating cavitated long carbon chain fractions of crude oil with an electron beam to create short carbon chain fractions; enriching short carbon chain fractions with acetylene; irradiating acetylene enriched short carbon chain fractions with an electron beam; cooling irradiated gas mixture; and removing liquefied highly-branched hydrocarbons.

A method for converting long carbon chain fractions of crude oil into highly-branched liquefiable hydrocarbons may include cavitating long carbon chain fractions of crude oil with natural gas; irradiating cavitated long carbon chain fractions of crude oil with an electron beam to create short carbon chain fractions; enriching short carbon chain fractions with acetylene; irradiating acetylene enriched short carbon chain fractions with an electron beam sustained non-thermal plasma discharge; cooling irradiated gas mixture; and removing liquefied highly-branched hydrocarbons.

A method for converting long carbon chain fractions of crude oil into highly-branched liquefiable hydrocarbons may include cavitating long carbon chain fractions of crude oil with natural gas; irradiating cavitated long carbon chain fractions of crude oil enriched natural gas with an electron beam sustained non-thermal plasma discharge to create short carbon chain fractions; enriching short carbon chain fractions with acetylene; irradiating acetylene enriched short carbon chain fractions with an electron beam; cooling irradiated gas mixture; and removing liquefied highly-branched hydrocarbons.

A method for removing petroleum from water may include cavitating the petroleum/water mixture with air; irradiating the cavitated petroleum/water mixture with an electron beam sustained non-thermal plasma discharge to create ozone; and filtering the water from the irradiated mixture.

The petroleum/water mixture may be cavitated by introducing air into the petroleum/water mixture to create air bubbles in the petroleum/water mixture; agitating the bubblified petroleum/water mixture to reduce bubble size: and ejecting the bubblified petroleum/water mixture jet spray so that jet spray is irradiated with the electron beam sustained non-thermal plasma discharge.

The jet spray may be generated by an expansion nozzle.

The jet spray may be generated by a nozzle and pressurized gas.

A method for treating solid waste may include processing the solid waste, using a digester, to create wet sludge; and cavitating and irradiating the wet sludge with an electron beam sustained non-thermal plasma discharge to dewater the sludge.

A method for treating solid waste may include processing the solid waste, using a digester, to create wet sludge; and irradiating the wet sludge with an electron beam sustained non-thermal plasma discharge to dewater the sludge.

A method for treating solid waste may include cavitating and irradiating the solid waste with an electron beam sustained non-thermal plasma discharge; processing the irradiated solid waste, using a digester, to create wet sludge; and cavitating and irradiating the wet sludge with an electron beam sustained non-thermal plasma discharge to dewater the sludge.

A method for treating solid waste may include cavitating and irradiating the solid waste with an electron beam sustained non-thermal plasma discharge; processing the irradiated solid waste, using a digester, to create wet sludge; and irradiating the wet sludge with an electron beam sustained non-thermal plasma discharge to dewater the sludge.

A method for converting first carbon chain condensable fractions of wet natural gas, the first carbon chain fractions having first carbon chains, into liquefiable highly-branched hydrocarbons cavitates first carbon chain condensable fractions of wet natural gas with natural gas to create a natural gas cavitated condensable fractions of wet natural gas; irradiates the natural gas cavitated condensable fractions of wet natural gas with an electron beam to create second carbon chain fractions, the second carbon chain fractions including carbon chains shorter than the first carbon chains of the first carbon chain fractions; mixes the second carbon chain fractions with natural gas enriched with alkynes and alkenes to a create enriched natural gas and second carbon chain fractions mixture irradiates the enriched natural gas and second carbon chain fractions mixture with an electron beam combined with electron beam sustained non-thermal plasma discharge to create an irradiated gas mixture; cools the irradiated gas mixture to create a cooled irradiated gas mixture; and removes liquefied highly-branched hydrocarbons from the cooled irradiated gas mixture.

The wet natural gas may be blended with crude oil. The wet natural gas may be a natural gas condensate.

A method for converting first carbon chain condensable fractions of wet natural gas, the first carbon chain fractions having first carbon chains, into liquefiable highly-branched hydrocarbons cavitates first carbon chain condensable fractions of wet natural gas with natural gas to create a natural gas cavitated condensable fractions of wet natural gas; irradiates the natural gas cavitated condensable fractions of wet natural gas with an electron beam to create second carbon chain fractions, the second carbon chain fractions including carbon chains shorter than the first carbon chains of the first carbon chain fractions; mixes the second carbon chain fractions with natural gas enriched with alkynes and alkenes to a create enriched natural gas and second carbon chain fractions mixture; irradiates the enriched natural gas and second carbon chain fractions mixture with an electron beam sustained non-thermal plasma discharge to create an irradiated gas mixture; cools the irradiated gas mixture to create a cooled irradiated gas mixture; and removes liquefied highly-branched hydrocarbons from the cooled irradiated gas mixture.

The wet natural gas may be blended with crude oil. The wet natural gas may be a natural gas condensate.

A method for converting first molecular weight fractions of natural polymers derived from ground dry biomass into a diversified mixture of liquefied organic compounds with added branching to both linear and cyclic monomers, the first molecular weight fractions of natural polymers derived from ground dry biomass being a higher molecular weight than the diversified mixture of liquefied organic compounds with added branching to both linear and cyclic monomers, mixes solid particulates of ground dry biomass with natural gas enriched with alkynes and alkenes to create the particulates and enriched natural gas mixture; irradiates the particulates and enriched natural gas mixture with an electron beam to create irradiated natural gas and the first molecular weight fractions vapors mixture; mixes irradiated gas and the first molecular weight fractions vapors with natural gas enriched with alkynes and alkenes to create an enriched natural gas and second molecular weight fractions vapors mixture, the second molecular weight fractions including fractions with molecular weight smaller than the molecular weight of the first molecular weight fractions; irradiates an enriched natural gas and second molecular weight fractions vapors mixture with an electron beam combined with electron beam sustained non-thermal discharge to create irradiated natural gas and vapors mixture; cools the irradiated natural gas and vapors mixture, to create a cooled irradiated gaseous and vapors mixture; and removes liquefied fractions from the cooled irradiated gas and vapors mixture.

A method for converting first molecular weight fractions of natural polymers derived from ground dry biomass into a diversified mixture of liquefied organic compounds with added branching to both linear and cyclic monomers, the first molecular weight fractions of natural polymers derived from ground dry biomass being a higher molecular weight than the diversified mixture of liquefied organic compounds with added branching to both linear and cyclic monomers, mixes solid particulates of ground dry biomass with natural gas enriched with alkynes and alkenes to create the particulates and enriched natural gas mixture; irradiates the particulates and enriched natural gas mixture with an electron beam to create irradiated natural gas and the first molecular weight fractions vapors mixture; mixes irradiated gas and the first molecular weight fractions vapors with natural gas enriched with alkynes and alkenes to create an enriched natural gas and second molecular weight fractions vapors mixture, the second molecular weight fractions including fractions with molecular weight smaller than the molecular weight of the first molecular weight fractions; irradiates an enriched natural gas and second molecular weight fractions vapors mixture with an electron beam sustained non-thermal discharge to create irradiated natural gas and vapors mixture; cools the irradiated natural gas and vapors mixture, to create a cooled irradiated gaseous and vapors mixture; and removes liquefied fractions from the cooled irradiated gas and vapors mixture.

A method for converting first carbon chain condensable fractions of wet natural gas, the first carbon chain fractions having first carbon chains, into liquefiable highly-branched hydrocarbons, cavitates first carbon chain condensable fractions of wet natural gas with natural gas to create a natural gas cavitated condensable fractions of wet natural gas; irradiates the natural gas cavitated condensable fractions of wet natural gas with high-energy electrons to create second carbon chain fractions, the second carbon chain fractions including carbon chains shorter than the first carbon chains of the first carbon chain fractions; mixes the second carbon chain fractions with natural gas enriched with alkynes and alkenes to a create enriched natural gas and second carbon chain fractions mixture; irradiates the enriched natural gas and second carbon chain fractions mixture with high-energy electrons to create an irradiated gas mixture; cools the irradiated gas mixture to create a cooled irradiated gas mixture; and removes liquefied highly-branched hydrocarbons from the cooled irradiated gas mixture.

The wet natural gas may be blended with crude oil. The wet natural gas may be a natural gas condensate.

The high-energy electrons may be an electron beam created by an electron beam accelerator. The high-energy electrons may be an electron beam created by an electron beam accelerator combined with an electron beam sustained non-thermal plasma discharge.

A method for converting first molecular weight fractions of natural polymers derived from ground dry biomass into a diversified mixture of liquefied organic compounds with added branching to both linear and cyclic monomers, the first molecular weight fractions of natural polymers derived from ground dry biomass being a higher molecular weight than the diversified mixture of liquefied organic compounds with added branching to both linear and cyclic monomers, mixes solid particulates of ground dry biomass with natural gas enriched with alkynes and alkenes to create the particulates and enriched natural gas mixture; irradiates the particulates and enriched natural gas mixture with high-energy electrons to create irradiated natural gas and the first molecular weight fractions vapors mixture; mixes irradiated gas and the first molecular weight fractions vapors with natural gas enriched with alkynes and alkenes to create an enriched natural gas and second molecular weight fractions vapors mixture, the second molecular weight fractions including fractions with molecular weight smaller than the molecular weight of the first molecular weight fractions; irradiates an enriched natural gas and second molecular weight fractions vapors mixture with high-energy electrons to create irradiated natural gas and vapors mixture; cools the irradiated natural gas and vapors mixture, to create a cooled irradiated gaseous and vapors mixture; and removes liquefied fractions from the cooled irradiated gas and vapors mixture.

The biomass may be lignocellulosic biomass. The biomass may be a solid waste.

The high-energy electrons may be an electron beam created by an electron beam accelerator. The high-energy electrons may be an electron beam created by an electron beam accelerator combined with an electron beam sustained non-thermal plasma discharge.

A method for converting first carbon chain condensable fractions of wet natural gas, the first carbon chain fractions having first carbon chains, into liquefiable highly-branched hydrocarbons, cavitates first carbon chain condensable fractions of wet natural gas with natural gas to create a natural gas cavitated condensable fractions of wet natural gas; irradiates the natural gas cavitated condensable fractions of wet natural gas with high-energy electrons to create second carbon chain fractions, the second carbon chain fractions including carbon chains shorter than the first carbon chains of the first carbon chain fractions; mixes the second carbon chain fractions with natural gas enriched with alkynes and alkenes to a create enriched natural gas and second carbon chain fractions mixture; irradiates the enriched natural gas and second carbon chain fractions mixture with high-energy electrons to create an irradiated gas mixture; cools the irradiated gas mixture to create a cooled irradiated gas mixture; and removes liquefied highly-branched hydrocarbons from the cooled irradiated gas mixture.

The wet natural gas may be blended with crude oil. The wet natural gas may be a natural gas condensate.

The high-energy electrons may be an electron beam created by an electron beam accelerator. The high-energy electrons may be an electron beam created by an electron beam accelerator combined with an electron beam sustained non-thermal plasma discharge.

The natural gas cavitated condensable fractions of wet natural gas may be irradiated with high-energy electrons from an electron beam created by an electron beam accelerator and the enriched natural gas and second carbon chain fractions mixture may be irradiated with high-energy electrons from an electron beam created by an electron beam accelerator combined with an electron beam sustained non-thermal plasma discharge.

The natural gas cavitated condensable fractions of wet natural gas may be irradiated with high-energy electrons from an electron beam created by an electron beam accelerator combined with an electron beam sustained non-thermal plasma discharge and the enriched natural gas and second carbon chain fractions mixture may be irradiated with high-energy electrons from an electron beam created by an electron beam accelerator.

A method for converting first molecular weight fractions of natural polymers derived from ground dry biomass into a diversified mixture of liquefied organic compounds with added branching to both linear and cyclic monomers, the first molecular weight fractions of natural polymers derived from ground dry biomass being a higher molecular weight than the diversified mixture of liquefied organic compounds with added branching to both linear and cyclic monomers, mixes solid particulates of ground dry biomass with natural gas enriched with alkynes and alkenes to create the particulates and enriched natural gas mixture; irradiates the particulates and enriched natural gas mixture with high-energy electrons to create irradiated natural gas and the first molecular weight fractions vapors mixture; mixes irradiated gas and the first molecular weight fractions vapors with natural gas enriched with alkynes and alkenes to create an enriched natural gas and second molecular weight fractions vapors mixture, the second molecular weight fractions including fractions with molecular weight smaller than the molecular weight of the first molecular weight fractions; irradiates an enriched natural gas and second molecular weight fractions vapors mixture with high-energy electrons to create irradiated natural gas and vapors mixture; cools the irradiated natural gas and vapors mixture, to create a cooled irradiated gaseous and vapors mixture; and removes liquefied fractions from the cooled irradiated gas and vapors mixture.

The biomass may be lignocellulosic biomass. The biomass may be a solid waste.

The high-energy electrons may be an electron beam created by an electron beam accelerator. The high-energy electrons may be an electron beam created by an electron beam accelerator combined with an electron beam sustained non-thermal plasma discharge.

The particulates and enriched natural gas mixture may be irradiated with high-energy electrons from an electron beam created by an electron beam accelerator and the enriched natural gas and second molecular weight fractions vapors mixture may be irradiated with high-energy electrons from an electron beam created by an electron beam accelerator combined with an electron beam sustained non-thermal plasma discharge.

The particulates and enriched natural gas mixture may be irradiated with high-energy electrons from an electron beam created by an electron beam accelerator combined with an electron beam sustained non-thermal plasma discharge and the enriched natural gas and second molecular weight fractions vapors mixture may be irradiated with high-energy electrons from an electron beam created by an electron beam accelerator.

It will be appreciated that variations of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above.

What is claimed is:

1. A method for converting first carbon chain condensable fractions of wet natural gas, the first carbon chain fractions having first carbon chains, into liquefiable highly-branched hydrocarbons, comprising:
    (a) cavitating first carbon chain condensable fractions of wet natural gas with natural gas to create a natural gas cavitated condensable fractions of wet natural gas;
    (b) irradiating the natural gas cavitated condensable fractions of wet natural gas with high-energy electrons to create second carbon chain fractions, the second carbon chain fractions including carbon chains shorter than the first carbon chains of the first carbon chain fractions;
    (c) mixing the second carbon chain fractions with natural gas enriched with alkynes and alkenes to a create enriched natural gas and second carbon chain fractions mixture;
    (d) irradiating the enriched natural gas and second carbon chain fractions mixture with high-energy electrons to create an irradiated gas mixture;
    (e) cooling the irradiated gas mixture to create a cooled irradiated gas mixture; and
    (f) removing liquefied highly-branched hydrocarbons from the cooled irradiated gas mixture.

2. The method as claimed in claim 1, wherein said wet natural gas is blended with crude oil.

3. The method as claimed in claim 1, wherein said wet natural gas is a natural gas condensate.

4. The method as claimed in claim 1, wherein said high-energy electrons is an electron beam created by an electron beam accelerator.

5. The method as claimed in claim 1, wherein said high-energy electrons is an electron beam created by an electron beam accelerator combined with an electron beam sustained non-thermal plasma discharge.

6. The method as claimed in claim 1, wherein said natural gas cavitated condensable fractions of wet natural gas is irradiated with high-energy electrons from an electron beam created by an electron beam accelerator and said enriched natural gas and second carbon chain fractions mixture is irradiated with high-energy electrons from an electron beam created by an electron beam accelerator combined with an electron beam sustained non-thermal plasma discharge.

7. The method as claimed in claim 1, wherein said natural gas cavitated condensable fractions of wet natural gas is irradiated with high-energy electrons from an electron beam created by an electron beam accelerator combined with an electron beam sustained non-thermal plasma discharge and said enriched natural gas and second carbon chain fractions mixture is irradiated with high-energy electrons from an electron beam created by an electron beam accelerator.

8. The method as claimed in claim 2, wherein said high-energy electrons is an electron beam created by an electron beam accelerator.

9. The method as claimed in claim 2, wherein said high-energy electrons is an electron beam created by an electron beam accelerator combined with an electron beam sustained non-thermal plasma discharge.

10. A method for converting first molecular weight fractions of natural polymers derived from ground dry biomass into a diversified mixture of liquefied organic compounds with added branching to both linear and cyclic monomers, the first molecular weight fractions of natural polymers derived from ground dry biomass being a higher molecular weight than the diversified mixture of liquefied organic compounds with added branching to both linear and cyclic monomers, comprising:
    (a) mixing solid particulates of ground dry biomass with natural gas enriched with alkynes and alkenes to create enriched natural gas and particulate mixture;
    (b) irradiating the enriched natural gas and particulate mixture with high-energy electrons to create an irradiated natural gas and first molecular weight fractions vapors mixture;
    (c) mixing the irradiated gas and first molecular weight fractions vapors mixture with natural gas enriched with alkynes and alkenes to create an enriched natural gas and second molecular weight fractions vapors mixture, the second molecular weight fractions including fractions with molecular weight smaller than the molecular weight of the first molecular weight fractions;

(d) irradiating the enriched natural gas and second molecular weight fractions vapors mixture with high-energy electrons to create an irradiated natural gas and vapors mixture;

(e) cooling the irradiated natural gas and vapors mixture, to create a cooled irradiated gas and vapors mixture; and (f) removing liquefied fractions from the cooled irradiated gas and vapors mixture.

11. The method as claimed in claim 10, wherein said biomass is lignocellulosic biomass.

12. The method as claimed in claim 10, wherein said biomass is a solid waste.

13. The method as claimed in claim 10, wherein said high-energy electrons is an electron beam created by an electron beam accelerator.

14. The method as claimed in claim 10, wherein said high-energy electrons is an electron beam created by an electron beam accelerator combined with an electron beam sustained non-thermal plasma discharge.

15. The method as claimed in claim 10, wherein the enriched natural gas and particulate mixture is irradiated with high-energy electrons from an electron beam created by an electron beam accelerator and the enriched natural gas and second molecular weight fractions vapors mixture is irradiated with high-energy electrons from an electron beam created by an electron beam accelerator combined with an electron beam sustained non-thermal plasma discharge.

16. The method as claimed in claim 10, wherein the enriched natural gas and particulate mixture is irradiated with high-energy electrons from an electron beam created by an electron beam accelerator combined with an electron beam sustained non-thermal plasma discharge and the enriched natural gas and second molecular weight fractions vapors mixture is irradiated with high-energy electrons from an electron beam created by an electron beam accelerator.

17. The method as claimed in claim 11, wherein said high-energy electrons is an electron beam created by an electron beam accelerator.

18. The method as claimed in claim 11, wherein said high-energy electrons is an electron beam created by an electron beam accelerator combined with an electron beam sustained non-thermal plasma discharge.

19. The method as claimed in claim 11, wherein the enriched natural gas and particulate mixture is irradiated with high-energy electrons from an electron beam created by an electron beam accelerator and the enriched natural gas and second molecular weight fractions vapors mixture is irradiated with high-energy electrons from an electron beam created by an electron beam accelerator combined with an electron beam sustained non-thermal plasma discharge.

20. The method as claimed in claim 11, wherein the enriched natural gas and particulate mixture is irradiated with high-energy electrons from an electron beam created by an electron beam accelerator combined with an electron beam sustained non-thermal plasma discharge and the enriched natural gas and second molecular weight fractions vapors mixture is irradiated with high-energy electrons from an electron beam created by an electron beam accelerator.

21. The method as claimed in claim 12, wherein said high-energy electrons is an electron beam created by an electron beam accelerator.

22. The method as claimed in claim 12, wherein said high-energy electrons is an electron beam created by an electron beam accelerator combined with an electron beam sustained non-thermal plasma discharge.

23. The method as claimed in claim 12, wherein the enriched natural gas and particulate mixture is irradiated with high-energy electrons from an electron beam created by an electron beam accelerator and the enriched natural gas and second molecular weight fractions vapors mixture is irradiated with high-energy electrons from an electron beam created by an electron beam accelerator combined with an electron beam sustained non-thermal plasma discharge.

24. The method as claimed in claim 12, wherein the enriched natural gas and particulate mixture is irradiated with high-energy electrons from an electron beam created by an electron beam accelerator combined with an electron beam sustained non-thermal plasma discharge and the enriched natural gas and second molecular weight fractions vapors mixture is irradiated with high-energy electrons from an electron beam created by an electron beam accelerator.

* * * * *